(12) United States Patent
Kobori et al.

(10) Patent No.: US 8,394,535 B2
(45) Date of Patent: *Mar. 12, 2013

(54) ELECTRODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

(75) Inventors: Hiroyuki Kobori, Tokyo (JP); Shingo Komura, Tokyo (JP); Hidenobu Watanabe, Kashiwa (JP); Ryo Fujiwara, Yokohama (JP); Keisuke Nomura, Matsudo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,581

(22) Filed: Sep. 16, 2011

(65) Prior Publication Data

US 2012/0009479 A1   Jan. 12, 2012

Related U.S. Application Data

(63) Continuation of application No. PCT/JP2010/056913, filed on Apr. 19, 2010.

(30) Foreign Application Priority Data

Apr. 24, 2009 (JP) .............................. 2009-107178
Feb. 5, 2010 (JP) .................................. 2010-24839

(51) Int. Cl.
H01M 6/00 (2006.01)
H01M 10/00 (2006.01)
H01M 4/02 (2006.01)
H01M 4/13 (2010.01)
H01M 4/62 (2006.01)

(52) U.S. Cl. .......................... 429/232; 429/122; 429/209

(58) Field of Classification Search ................... 429/232
See application file for complete search history.

(56) References Cited

U.S. PATENT DOCUMENTS

| 4,902,589 | A | 2/1990 | Dahn et al. |
| 5,856,045 | A | 1/1999 | Fauteux et al. |
| 2002/0009645 | A1 | 1/2002 | Shima et al. |
| 2002/0039684 | A1 | 4/2002 | Matsubara et al. |
| 2002/0055046 | A1 | 5/2002 | Ono et al. |
| 2003/0082453 | A1 | 5/2003 | Numata et al. |

(Continued)

FOREIGN PATENT DOCUMENTS

| FR | 2 890 785 A1 | 3/2007 |
| JP | A-06-349482 | 12/1994 |

(Continued)

OTHER PUBLICATIONS

International Search Report issued in International Application No. PCT/JP2010/056913 on Jul. 27, 2010 (with translation).

(Continued)

*Primary Examiner* — Barbara Gilliam
*Assistant Examiner* — Steven Scully
(74) *Attorney, Agent, or Firm* — Oliff & Berridge, PLC

(57) ABSTRACT

An electrode plate for a non-aqueous electrolyte secondary battery comprises a current collector, and an electrode active material layer formed on at least part of the surface of the current collector. The electrode active material layer contains a particulate electrode active material and a binding material. The binding material is made of an amorphous metal oxide that does not cause alkaline metal ion intercalation and deintercalation reactions.

2 Claims, 5 Drawing Sheets

U.S. PATENT DOCUMENTS

| | | |
|---|---|---|
| 2004/0131940 A1 | 7/2004 | Suzuki et al. |
| 2005/0098242 A1 | 5/2005 | Hossick-Schott et al. |
| 2005/0130042 A1* | 6/2005 | Liu et al. .................... 429/231.3 |
| 2006/0003226 A1 | 1/2006 | Sawa et al. |
| 2006/0154071 A1 | 7/2006 | Homma et al. |
| 2006/0216604 A1 | 9/2006 | Kawase et al. |
| 2007/0154807 A1 | 7/2007 | Kalynushkin et al. |
| 2008/0032197 A1 | 2/2008 | Horpel et al. |
| 2008/0131781 A1 | 6/2008 | Yong et al. |
| 2010/0000079 A1 | 1/2010 | Hörpel et al. |
| 2010/0003401 A1 | 1/2010 | Hörpel et al. |
| 2010/0203393 A1 | 8/2010 | Depond |

FOREIGN PATENT DOCUMENTS

| | | |
|---|---|---|
| JP | A-9-503092 | 3/1997 |
| JP | A-10-208747 | 8/1998 |
| JP | A-11-144736 | 5/1999 |
| JP | A-2000-277119 | 10/2000 |
| JP | A-2001-155739 | 6/2001 |
| JP | A-2001-508916 | 7/2001 |
| JP | A-2002-141069 | 5/2002 |
| JP | A-2002-260656 | 9/2002 |
| JP | A-2003-142101 | 5/2003 |
| JP | A-2003-317707 | 11/2003 |
| JP | A-2004-087492 | 3/2004 |
| JP | A-2004-103304 | 4/2004 |
| JP | A-2005-78985 | 3/2005 |
| JP | A-2005-078985 | 3/2005 |
| JP | A-2005-78991 | 3/2005 |
| JP | A-2006-107750 | 4/2006 |
| JP | A-2006-310010 | 11/2006 |
| JP | A-2007-527603 | 9/2007 |
| JP | A-2008-517435 | 5/2008 |
| JP | A-2009-104818 | 5/2009 |
| JP | A-2009-181879 | 8/2009 |
| JP | A-2010-67436 | 3/2010 |
| JP | A-2010-129418 | 6/2010 |
| WO | WO 95/09449 A1 | 4/1995 |
| WO | WO 98/22986 A2 | 5/1998 |
| WO | WO 2006/045339 A2 | 5/2006 |

OTHER PUBLICATIONS

International Preliminary Report on Patentability dated Dec. 1, 2011 in International Application No. PCT/JP2010/056913.
May 31, 2012 Office Action issued in U.S. Appl. No. 12/659,738.
Dec. 1, 2010 Notification of Reasons for Rejection issued in corresponding Japanese Patent Application No. 2008-252684 with English-language translation.
U.S. Appl. No. 12/659,738 filed in the name of Hiroyuki Kobori et al. on Mar. 19, 2010.
Dec. 1, 2010 Office Action issued in Japanese Patent Application No. 2008-252685 (with translation).
Mar. 22, 2012 Office Action issued in U.S. Appl. No. 12/659,892.
Nov. 10, 2011 Office Action issued in U.S. Appl. No. 12/659,892.
U.S. Appl. No. 12/659,892 filed in the name of Hiroyuki Kobori on Mar. 24, 2010.
Nov. 22, 2011 International Preliminary Report on Patentability issued in International application No. PCT/JP2010/056584 (with translation).
Jul. 6, 2010 International Search Report in International Application No. PCT/JP2010/056584 (with translation).
Jul. 20, 2010 International Search Report issued in International Patent Application No. PCT/JP2010/056939.
Jul. 20, 2010 International Preliminary Report on Patentability issued in International Patent Application No. PCT/JP2010/056939.
Jul. 27, 2011 Office Action issued in Japanese Patent Application No. 2010-024837 (with translation).
Jul. 20, 2010 International Search Report issued in International Application No. PCT/JP2010/056940 (with translation).
Nov. 22, 2011 International Preliminary Report on Patentability issued in International Application No. PCT/JP2010/056912.
Jul. 27, 2010 International Search Report issued in International Patent Application No. PCT/JP2010/056912 (with translation).
U.S. Appl. No. 13/139,688, filed Jun. 14, 2011 in the name of Keisuke Nomura et al.
Jul. 13, 2012 U.S. Office Action issued in U.S. Appl. No. 13/139,688.
U.S. Appl. No. 13/265,220, filed Oct. 19, 2011 in the name of Hiroyuki Kobori et al.
Jun. 27, 2012 U.S. Office Action issued in U.S. Appl. No. 13/265,220.
U.S. Appl. No. 13/265,266, filed Oct. 19, 2011 in the name of Hiroyuki Kobori et al.
Jun. 21, 2012 U.S. Office Action issued in U.S. Appl. No. 13/265,266.
U.S. Appl. No. 13/257,177, filed Sep. 16, 2011 in the name of Hiroyuki Kobori et al.
Jun. 21, 2012 U.S. Office Action issued in U.S. Appl. No. 13/257,177.
U.S. Office Action dated Nov. 26, 2012 issued in U.S. Appl. No. 12/659,738.

* cited by examiner

ELECTRODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

CROSS-REFERENCE TO RELATED APPLICATIONS

This is an application claiming priority on the basis of Japanese Patent Applications No 2009-107178 filed on Apr. 24, 2009 and No. 2010-24839 filed on Feb. 5, 2010. The whole contents of the said earlier applications are incorporated herein by reference.

BACKGROUND OF THE INVENTION

1. Field of the Invention

The present invention relates to an electrode plate for use in a non-aqueous electrolyte secondary battery such as lithium-ion secondary battery, to a method for producing the same, and to a non-aqueous electrolyte secondary battery.

2. Background Art

Non-aqueous electrolyte secondary batteries represented by lithium-ion secondary batteries have high energy density and high voltage, and do not cause the memory effect (a phenomenon in which a battery gradually loses its capacity when charged before it is completely discharged) on charge or discharge. Owing to these advantageous features, non-aqueous electrolyte secondary batteries are used in a variety of fields, such as the field of portable devices and that of laptop personal computers.

In general, the above non-aqueous electrolyte secondary battery is composed of an anode plate, a cathode plate, a separator, and a non-aqueous electrolyte. For the anode plate, an electrode plate having an electrode active material layer formed by a particulate anode active material that is fixed to the surface of a current collector made of metal foil or the like is usually used. For the cathode plate is usually used an electrode plate having an electrode active material layer formed by a particulate cathode active material that is fixed to the surface of a current collector made from copper, aluminum, or the like.

A conventional method for producing an electrode plate that serves as the above anode or cathode plate is as follows. An electrode active material layer-forming composition in the form of a slurry is first prepared by kneading and/or dispersing, in a solvent, a particulate electrode active material that is a particulate anode or cathode active material, a resin binder, and a conductive material (provided that when electrode performance can be fully obtained without a conductive material, e.g., in the case where the particulate cathode active material also has electrical conductivity, the conductive material may not be used), and, if necessary, other materials. The electrode active material layer-forming composition is applied to the surface of a current collector and then dried, and the coating film thus formed on the current collector is pressed, thereby obtaining an electrode plate having an electrode active material layer (e.g., JP 2006-310010A and 3P2006-107750A).

The particulate electrode active material which is used in the electrode active material layer-forming composition is a particulate metallic compound dispersible in the composition. The particulate metallic compound itself cannot fix well to the surface of a current collector even if pressed after it has been applied to the current collector surface and then dried, and easily peels off the current collector. In order to overcome this drawback, a resin binder is added to the electrode active material layer-forming composition, and by means of the resin binder, the particulate electrode active material is fixed to a current collector to form an electrode active material layer. Thus, a resin binder has been considered to be a substantially essential ingredient of the electrode active material layer-forming composition.

In recent years, the development of lithium-ion secondary batteries for use in the fields of electric vehicles, hybrid vehicles, power tools, etc. that are needed to have high output and input characteristics has been advanced. Further, even secondary batteries for use in relatively-small-sized devices, such as mobile phones, are expected to have improved output and input characteristics, since such devices tend to be provided with a larger number of functions. In order to realize improvement of secondary batteries in output and input characteristics, it is necessary to decrease the impedance of the secondary batteries. This is because secondary batteries having high impedance suffer some problems; e.g., they cannot make the best use of their capacities on high-speed charging and discharging.

In order to decrease the impedance of a secondary battery, decreasing the impedance of the electrode plates of the secondary battery is effective, and increasing the electrode areas by making the electrode active material layers in the electrode plates thinner has been known as a means for decreasing the impedance. Further, since non-aqueous electrolytes for use in lithium-ion secondary batteries generally have higher resistivity than aqueous electrolytes, there has been discussed, from the beginning of the development of lithium-ion secondary batteries, an embodiment using thinner electrode plates with larger electrode areas and a smaller electrode gap than those in other batteries such as lead accumulators.

However, when the presence of ingredients other than the particulate active material in the electrode active material layer is also taken into account, it is impossible to make the electrode active material layer thinner without limitation. Practically, the lower limit of the thickness of the electrode active material layer has been about several tens micrometers.

Another effective approach to improvement of electrode plates in high output and input characteristics is the use of a particulate active material with a smaller particle diameter. The use of a particulate active material with a smaller particle diameter can make the total surface area of the particulate electrode active material in the electrode active material layer larger, and moreover, it can make the distance of movement, in one particle of the electrode active material, of lithium ion that intercalates in and deintercalates from the particle of the electrode active material shorter. Consequently, the behavior of lithium ion becomes smoother, which leads to improvement in output and input characteristics.

Practically, however, the viscosity of the electrode active material layer-forming composition tends to increase as the particle diameter of the particles of the active material decreases. This tendency was significantly observed especially when a particulate active material with a particle diameter of 11 μm or less, or with a particle diameter much smaller than this, was used. For this reason, the practicable particle diameter of the particulate active material is substantially limited, which has been disadvantageous to the above attempt to make the electrode active material layer thinner.

SUMMARY OF THE INVENTION

In the light of the above circumstances, the present invention was accomplished. An object of the present invention is therefore to provide an electrode plate for use in a non-aqueous electrolyte secondary battery, having high output and input characteristics. Another object of the present invention is to provide a non-aqueous electrolyte secondary battery having high output and input characteristics with the use of the above electrode plate. A further object of the present invention is to provide a method for producing the above electrode plate.

The inventors found that it is possible to fix a particulate electrode active material to a current collector through a metal oxide that is amorphous and that does not cause alkaline metal ion intercalation and deintercalation reactions, without using a resin binder that is used conventionally, and that improvement in output and input characteristics can be attained by using such a metal oxide for fixing a particulate electrode active material to a current collector. On the basis of these findings, the inventors accomplished the present invention, that is, an electrode plate for a non-aqueous electrolyte secondary battery and a non-aqueous electrolyte secondary battery using the electrode plate.

Besides, the inventors devised the following method as a means for producing an electrode plate comprising an electrode active material layer formed by a particulate electrode active material fixed to a current collector, without a resin binder, through a metal oxide that is amorphous and that does not cause alkaline metal ion intercalation and deintercalation reactions: a composition containing at least a metallic-element-containing compound for forming a metal oxide that serves as a binding material and a particulate electrode active material is prepared and is applied to a current collector, and the coating film thus formed on the current collector is heated at a proper temperature.

In other words, the inventors found that by heating the above coating film formed on the current collector at a temperature equal to or more than the temperature at which the metallic-element-containing compound begins to decompose thermally, and less than the crystallization temperature of the metal oxide to be formed, it is possible to cause the metallic-element-containing compound to give the metal oxide that serves as a binding material, and also to fix the particles of the electrode active material present around the binding material to the current collector. On the basis of this finding, the inventors accomplished the present invention, a method for producing an electrode plate for a non-aqueous electrolyte secondary battery.

An electrode plate for a non-aqueous electrolyte secondary battery according to the present invention comprises:
a current collector, and
an electrode active material layer formed on at least part of the surface of the current collector,
wherein the electrode active material layer comprises a particulate electrode active material (electrode active material particles) and a binding material,
the binding material being made of an amorphous metal oxide that does not cause alkaline metal ion intercalation and deintercalation reactions.

In the electrode plate for a non-aqueous electrolyte secondary battery according to the present invention, the electrode active material layer may further comprise a conductive material.

In the electrode plate for a non-aqueous electrolyte secondary battery according to the present invention, the metal oxide is one containing a metallic element selected from the group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn, or a metal double oxide (combined metal oxide) containing two or more metallic elements selected from the above group.

In the electrode plate for a non-aqueous electrolyte secondary battery according to the present invention, the particulate electrode active material may have a particle diameter of 11 μm or less.

A non-aqueous electrolyte secondary battery according to the present invention comprises:
an anode plate,
a cathode plate,
a separator placed between the anode plate and the cathode plate, and
an electrolyte containing a non-aqueous solvent,
wherein the anode plate and/or the cathode plate comprises:
a current collector, and
an electrode active material layer formed on at least part of the
surface of the current collector,
the electrode active material layer containing a particulate electrode active material and a binding material,
the binding material being made of an amorphous metal oxide
that does not cause alkaline metal ion intercalation and deintercalation reactions.

A method for producing an electrode plate for a non-aqueous electrolyte secondary battery according to the present invention comprises the steps of:
applying an electrode active material layer-forming composition containing at least a solvent, a particulate electrode active material, and a metallic-element-containing compound for forming a metal oxide that serves as a binding material to at least part of a current collector, thereby forming a coating film, and
heating the coating film so as to evaporate the solvent and to decompose the metallic-element-containing compound thermally into a metal oxide, thereby forming, on the current collector, an electrode active material layer containing the metal oxide and the particulate electrode active material,
wherein a metallic-element-containing compound that forms, in the heating step, a metal oxide that does not cause alkaline metal ion intercalation and deintercalation reactions is selected beforehand as the metallic-element-containing compound, and
in the heating step, the coating film is heated at a temperature that is equal to or more than the temperature at which the metallic-element-containing compound beings to decompose thermally, and that is less than the crystallization temperature of the metal oxide that is formed in the heating step.

In the method for producing an electrode plate for a non-aqueous electrolyte secondary battery according to the present invention, the metallic-element-containing compound may be a metal salt.

An electrode plate for a non-aqueous electrolyte secondary battery (hereinafter also referred to simply as an "electrode plate") according to the present invention comprises an electrode active material layer formed by a particulate electrode active material that is fixed to a current collector owing to the presence of a metal oxide that is amorphous and that does not cause alkaline metal ion intercalation and deintercalation reactions, without a resin binder, which is used in the prior art. The electrode plate of the present invention can exhibit extremely high output and input characteristics as compared with a conventional electrode plate for a non-aqueous electrolyte secondary battery, using a resin binder, even when the particulate electrode active material and its amount used for the electrode plate of the invention are the same as those used for the conventional electrode plate. Moreover, the electrode plate of the invention is much more excellent in the adhesion of the electrode active material layer to the current collector than the conventional electrode plate using a resin binder. The electrode active material layer in the electrode plate of the invention is thus excellent in film-forming properties.

An electrode plate of the invention is improved in the output and input characteristics, as mentioned above, so that its use as the anode plate and/or the cathode plate makes it possible to provide a non-aqueous electrolyte secondary battery improved in output and input characteristics.

By the method for producing an electrode plate for a non-aqueous electrolyte secondary battery of the present invention (hereinafter also referred to simply as the "production method of the present invention"), it is possible to produce easily an electrode plate for a non-aqueous electrolyte secondary battery more improved in output and input characteristics than a conventional electrode plate, with the use of general-purpose materials.

Moreover, the electrode active material layer-forming composition containing at least the metallic-element-containing compound and the particulate electrode active material has such a viscosity value as to show good coating properties on application to a current collector, irrespective of the particle diameter of the particulate active material. It has, therefore, become possible to use a particulate active material with a small particle size, of which use in a conventional electrode active material layer-forming composition that contains a resin binder has been difficult because it makes the viscosity of the composition extremely high. Furthermore, since the electrode active material layer-forming composition shows good coating properties when applied to a current collector, it can be applied to a current collector to a desired thickness.

DETAILED DESCRIPTION OF THE INVENTION

Embodiments for carrying out the electrode plate for a non-aqueous electrolyte secondary battery, the method for producing the electrode plate for a non-aqueous electrolyte secondary battery, and the non-aqueous electrolyte secondary battery according to the present invention will be hereinafter described in order. Taking lithium-ion secondary battery as an example, the non-aqueous electrolyte secondary battery of the present invention will be explained in the following description, unless otherwise specified. As for the feature of the metal oxide in the present invention "not causing alkaline metal ion intercalation and deintercalation reactions", lithium ion is taken as an example of the alkaline metal ion in the explanation of intercalation and deintercalation of an alkaline metal ion, unless otherwise specified. Further, the electrode plate of the present invention can serve as both the anode plate and the cathode plate in a non-aqueous electrolyte secondary battery. The explanation of the electrode plate given in the following description, therefore, applies to both the anode plate and the cathode plate, unless otherwise specified. Explanation of the anode plate and that of the cathode plate are given separately, only when necessary.

[Electrode Plate for Non-Aqueous Electrolyte Secondary Battery]

Figure 9:
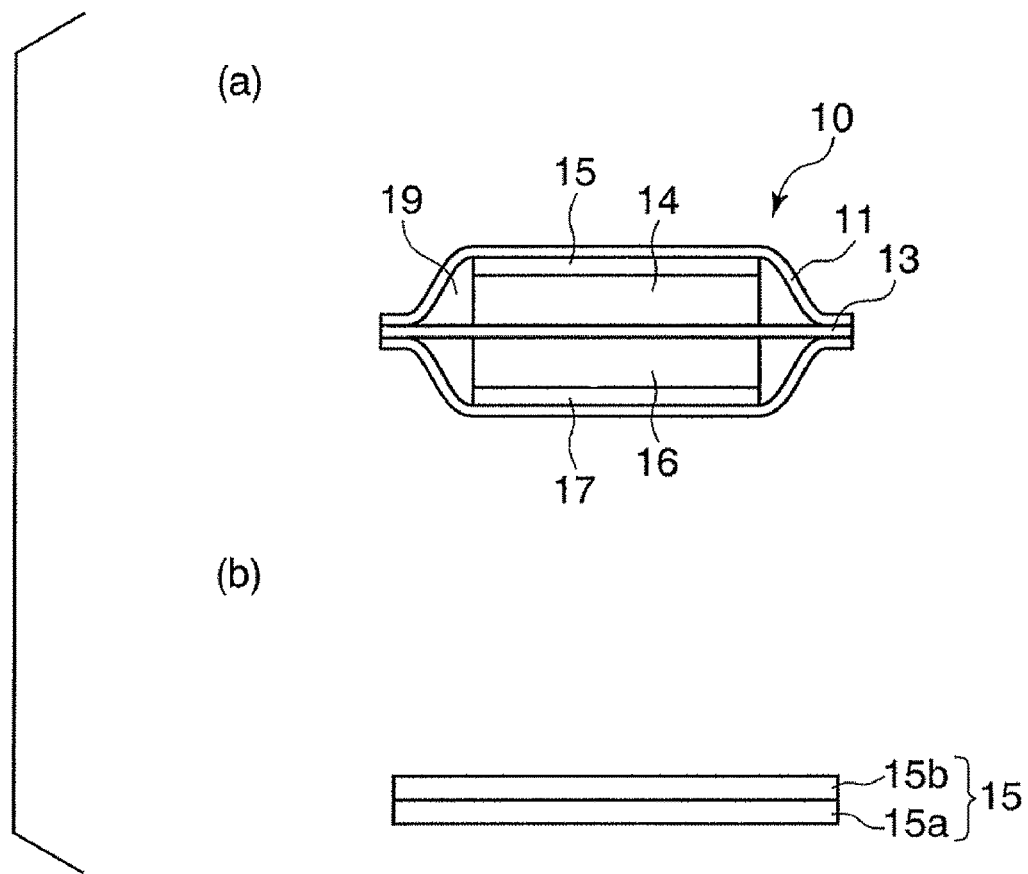
FIG. 9($a$) is a view showing a non-aqueous electrolyte secondary battery, and FIG. 9($b$) is a view showing a cathode plate for a non-aqueous electrolyte secondary battery.

A cathode plate 15 for a non-aqueous electrolyte secondary battery of this embodiment comprises a current collector 15$a$ and an electrode active material layer 15$b$ formed on at least part of the surface of the current collector 15$a$, as shown in FIG. 9($b$). The electrode active material layer 15$b$ contains a particulate electrode active material and a binding material. The binding material is made of an amorphous metal oxide that does not cause alkaline metal ion intercalation and deintercalation reactions. An electrode plate of the present invention comprises an electrode active material layer formed on at least part of a current collector. The electrode active material layer, the current collector, and the method for evaluating the charge and discharge rate characteristics of the electrode plate will be described hereinafter in order.

(Electrode Active Material Layer)

The electrode active material layer in the present invention is formed by a particulate electrode active material that is fixed to a current collector not by means of a resin binder, which is used in the prior art, but by means of an amorphous metal oxide that does not cause alkaline metal ion (e.g., lithium ion) intercalation and deintercalation reactions.

The selection of thickness for the electrode active material layer may be made in consideration of the electric capacity and the output and input characteristics required for the electrode plate. An electrode plate is usually designed so that its electrode active material layer has a thickness of 200 µm or less, typically 100 µm or more and 150 µm or less. In the present invention, however, it is possible to form an electrode active material layer with an extremely small thickness, so that there can be obtained an electrode active material layer with a thickness of 300 nm or more and 200 µm or less, depending on the particle diameter of the particulate electrode active material used to form the electrode active material layer. It is particularly preferable to make the thickness of the electrode active material layer 300 nm or more and 30 µm or less, more preferably 500 nm or more and 11 µm or less, because an electrode active material layer with such a small thickness can provide an electrode plate having improved output and input characteristics and large capacity.

To form an electrode active material layer with such a small thickness as is in the above-described range, a particulate electrode active material with a small particle diameter is used. The small particle diameter herein means that the particle diameter of the particulate electrode active material is smaller than at least the thickness of the electrode active material layer. The use of a particulate electrode active material with such a small particle diameter greatly contributes to the improvement in output and input characteristics. Moreover, when the electrode active material layer has such a small thickness, the distance of movement of electrons in the electrode active material layer, between the particulate electrode active material and the current collector, is short, so that the electrode plate has decreased resistivity, which leads to improvement in output and input characteristics. It is therefore desirable that the thickness of the electrode active material layer be small.

In the present invention, the lower limit of the thickness of the electrode active material layer depends chiefly on the particle diameter of the particulate electrode active material used to form the electrode active material layer. If it becomes possible to use a particulate electrode active material with a smaller particle diameter than ever, it will be able to form an electrode active material layer with a thickness smaller than the lower limit of the above-described range.

Furthermore, it is preferred that pores be present in the electrode active material layer to such an extent that an electrolyte can permeate the electrode active material layer. The porosity of the electrode active material layer is usually 15 to 40%, preferably 20 to 40%.

The ingredients of the electrode active material layer will be described hereinafter specifically.

Particulate Electrode Active Material:

The particulate electrode active material that is incorporated in the electrode active material layer in the present invention may be any particulate anode or cathode active material that is usually used in the electrode plate of a non-aqueous electrolyte secondary battery, as long as it causes lithium ion intercalation and deintercalation reactions and can be charged and discharged. In the present invention, the particles of the electrode active material stick to each other and also to the current collector owing to a metal oxide present between the particles of the electrode active material, and between the particulate electrode active material and the current collector, thereby forming an electrode active material layer on the current collector. The metal oxide acts as a binding material irrespective of the type or shape of the particles of the electrode active material.

Further, the metal oxide in the electrode active material layer in the present invention does not cause alkaline metal ion intercalation and deintercalation reactions, so that it does not affect any reaction of the particulate electrode active material as well. Also from this point of view, any particulate electrode active material can be used in the present invention without limitation. Of the particulate electrode active materials, the particulate anode active material that can be used in e.g., lithium-ion secondary battery specifically includes lithium-transition metal double oxides such as $LiCoO_2$, $LiMn_2O_4$, $LiNiO_2$, $LiFeO_2$, $Li_4Ti_5O_{12}$ and $LiFePO_4$. Similarly, the particulate cathode active material specifically includes particulate active materials made of natural graphite, synthetic graphite, amorphous carbon and carbon black; carbonaceous materials obtained by adding other elements to these materials; and materials that cause alkaline metal ion intercalation and deintercalation reactions, such as metal oxides, e.g., $Li_4Ti_5O_{12}$, metallic lithium and its alloys, and tin and silicon and their alloys.

No limitations are imposed on the particle diameter of the particles of the electrode active material for use in the present invention, and a particulate electrode active material with any particle diameter may be selected and used herein. For attaining higher output and input characteristics, however, it is desirable to select a particulate electrode active material with a smaller particle diameter. This is because a particulate electrode active material with a smaller particle diameter presents a larger total surface area in the electrode active material layer. That the selection of particle diameter for the particulate electrode active material can be made without limitation is one of the advantageous features of the present invention. In the production of a conventional electrode plate, it has been difficult to use a particulate electrode active material with a small particle diameter in an electrode active material layer-forming composition because such a particulate electrode active material makes the viscosity of the electrode active material layer-forming composition extremely high. On the other hand, in the electrode plate of the invention, a particulate electrode active material with any particle diameter can be incorporated in the electrode active material layer. It is therefore possible to make the total surface area of the particulate electrode active material in the electrode active material layer larger and also to make the distance of movement of lithium ion in one particle of the electrode active material shorter, which leads to considerable improvement in output and input characteristics. It is not clear why a particulate electrode active material with a smaller particle diameter than ever can be used in the present invention. The reason, however, may be that a metallic-element-containing compound for forming a metal oxide is incorporated in the electrode active material layer-forming composition, in place of a resin binder, which has been used in the prior art.

More specifically, in the case where a particulate electrode active material with a particle diameter of 11 μm or less is selected, a conventional electrode active material layer-forming composition is to have a high viscosity value; it has been difficult to control the viscosity of such an electrode active material layer-forming composition, and the composition has been poor in handling properties. On the other hand, in the production of an electrode plate of the invention, even when a particulate electrode active material with a particle diameter of 11 μm or less is used, the electrode active material layer-forming composition does not suffer any problem concerning its viscosity and shows good handling properties. It is therefore easy to produce an electrode plate comprising an electrode active material layer that contains a particulate electrode active material with a particle diameter of 11 μm or less. For attaining high output and input characteristics while retaining the handling properties of the electrode active material layer-forming composition, it is desirable to use a particulate electrode active material with a particle diameter of 11 μm or less.

Furthermore, for producing a conventional electrode plate that comprises an electrode active material layer containing a resin binder, if a particulate electrode active material with a particle diameter of 5 μm or less is used in an electrode active material layer-forming composition, the electrode active material layer-forming composition has an excessively high viscosity value and is to have no fluidity. Such a composition has been unusable with a facility for mass-production, e.g., a printing machine. It is possible to increase the fluidity of the above electrode active material layer-forming composition by adding a large amount of a solvent, but if a large amount of a solvent is added, it takes a very long time to dry the electrode active material layer-forming composition applied to a current collector. Addition of a large amount of a solvent is thus impracticable, and it has been impossible to take this measure especially in the production of an electrode plate with the use of a wind-up machine. In the present invention, on the other hand, even when a particulate electrode active material with a particle diameter of 5 μm or less is used in an electrode active material layer-forming composition, the electrode active material layer-forming composition has a moderate viscosity value and good fluidity, so that it can be used in the production of an electrode plate by a facility for mass-production. For this reason, for producing an electrode plate having high output and input characteristics by a facility for mass-production, it is desirable to use a particulate electrode active material with a particle diameter of 5 µm or less.

Furthermore, the difficulty in producing a conventional electrode plate that comprises an electrode active material layer containing a resin binder with the use of a particulate electrode active material with a particle diameter of 1 µM or less is that the operation of dispersing the particulate electrode active material in an electrode active material layer-forming composition is difficult in itself. It has therefore been impossible to produce an electrode plate with the use of a particulate electrode active material with such a small particle diameter. In the present invention, on the other hand, even a particulate electrode active material with a particle diameter of 1 µm or less can be satisfactorily dispersed in an electrode active material layer-forming composition, and an electrode active material layer containing such a particulate electrode active material can be formed on a current collector successfully. In the present invention, therefore, the use of a particulate electrode active material with a particle diameter of 1 µm or less is highly advantageous and desirable. From the above point of view, it is preferable, in the present invention, to select a particulate electrode active material with a particle diameter of 500 nm or less, more preferably 100 nm or less. In the present invention and in this specification, the particle diameter of a particulate electrode active material refers to the mean particle diameter obtained by laser diffraction/scattering particle-size-distribution measurement (volume median particle diameter: D50).

The particle diameter of the electrode active material in the electrode active material layer can be determined by using an electron micrograph of the particulate electrode active material and a software for image-analysis-type particle size distribution measurement ("MAC VIEW" manufactured by MOUNTECH CO., LTD., Japan).

Metal Oxide Serving as Binding Material:

Any metal oxide may be formed in the electrode active material layer as a binding material, as long as it is an oxide of a metallic element that is generally understood as metal, and is an amorphous metal oxide that does not cause lithium ion intercalation and deintercalation reactions. Examples of the metallic element include Li, Be, Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Hg, Tl, Pb, Bi, Fr, Ra, and Ce.

Of the above-enumerated metallic elements, metallic elements of groups 3 to 5 of the periodic table are preferred. This is because in an electrode plate of the invention, when an oxide of a metallic element of groups 3 to 5 is present as a binding material in the electrode active material layer, the electrode plate shows more improved output and input characteristics, although the reasons for this is not clear. In other words, it is more preferred that a metal oxide containing a metallic element selected from the group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn be present as a binding material in the electrode active material layer.

Of the metal oxides containing metallic elements of group 3 to 5 of the periodic table, titanium oxide is particularly preferred. This is because titanium oxide is inexpensive, is easy to handle, and, moreover, can show an excellent output-and-input-characteristics-improving effect when it is contained in an electrode active material layer as a binding material. An electrode plate for a non-aqueous electrolyte secondary battery of the present invention, comprising an electrode active material layer that contains titanium oxide as a binding material, can show a charge or discharge rate (percentage of discharge capacity retention) as high as 80% or more at a discharge rate of 50 C. This rate is high enough to use the electrode plate for a large-sized device such as an automobile.

The metal oxide in the present invention may be either a metal oxide composed of one of the above-enumerated metallic elements that is combined with oxygen, or a metal double oxide containing two or more metallic elements selected from the metallic elements enumerated above. Examples of the metal oxide composed of a metallic element combined with oxygen include sodium oxide, magnesium oxide, aluminum oxide, silicon oxide, potassium oxide, calcium oxide, scandium oxide, titanium oxide, vanadium oxide, chromium oxide, manganese oxide, iron oxide, cobalt oxide, nickel oxide, zinc oxide, gallium oxide, strontium oxide, yttrium oxide, zirconium oxide, molybdenum oxide, ruthenium oxide, tantalum oxide, tungsten oxide, and cerium oxide.

Examples of the metal double oxide that contains two or more metallic elements and that can be used as the metal oxide in the present invention include cerium oxide doped with gadolinium, zirconium oxide doped with yttrium, a double oxide of iron and titanium, a double oxide of indium and tin, and nickel oxide doped with lithium.

The metal oxides enumerated as examples in this paragraph never restrict the metal oxide in the present invention. In the present invention, the metal oxide capable of serving, on a current collector, as a binding material for the particulate electrode active material may be any metal oxide, as long as it is amorphous, does not cause lithium ion intercalation and deintercalation reactions, and can fix the particulate electrode active material to a current collector in the absence of a resin binder. Moreover, in the present invention, the above-enumerated metal oxides may be present in the electrode active material layer either singly or in combination.

Proportion of Binding Material:

In the present invention, the metal oxide and the particulate electrode active material may be present in the electrode active material layer in any proportion, and this proportion may be determined in consideration of the type and size of the particles of the electrode active material used to form the electrode active material layer, the type of the metal oxide, the functions required for the electrode, and so forth. In general, when the electrode active material layer contains a larger amount of the particulate electrode active material, the electrode plate has a larger electric capacity. From this point of view, it can be said that the lower is the proportion of the metal oxide to the particulate electrode active material in the electrode active material layer, the better.

More specifically, in the electrode active material layer, the metal oxide may be present in an amount of 1 part by weight or more and 50 parts by weight or less for 100 parts by weight of the particulate electrode active material. When the metal oxide is present in an amount of less than 1 part by weight for 100 parts by weight of the particulate electrode active material, the particulate electrode active material sometimes cannot be fixed to a current collector satisfactorily.

On the other hand, the mention of the upper limit of the proportion of the metal oxide to the particulate electrode active material is not intended to exclude a case where the metal oxide is present in the electrode active material layer in a proportion exceeding the upper limit, but to show that it is possible to fix the particulate electrode active material to a current collector with a smaller amount of the metal oxide.

Crystallinity of Binding Material:

The metal oxide in the present invention must be amorphous. In the present invention, that a metal oxide is amorphous means that the peaks representing the metal oxide are not observed on the X-ray diffraction pattern of the metal oxide or of a sample containing the metal oxide. Taking iron as an example of the metallic element, explanation will now be given with reference to the data actually obtained from the analyses of crystalline iron oxide and amorphous iron oxide carried out by X-ray diffractometry using an X-ray diffractometer.

4.0 g of $Fe(NO_3)_3 \cdot 9H_3O$ [molecular weight: 404] was first mixed with 15 g of methanol, and to this mixture was added 10 g of ethylene glycol, thereby obtaining a sample solution. Subsequently, Sample 1 and Sample 2, glass substrates coated with the sample solution, were obtained. Sample 1 was heated at a temperature of 300° C. for 1 hour, and Sample 2, at a temperature of 500° C. for 1 hour. Scraping off the heated films from Samples 1 and 2, Analysis Samples 1 and 2 were obtained, respectively, and they were subjected to composition analyses. The result of the composition analysis of Analysis Sample 1 was as follows: 34 atomic % element iron and 66 atomic % element oxygen. The result of the composition analysis of Analysis Sample 2 was as follows: 38 atomic % element iron and 62 atomic % element oxygen. The results show that both the iron in Analysis Sample 1 and that in Analysis Sample 2 have been oxidized.

Figure 1:
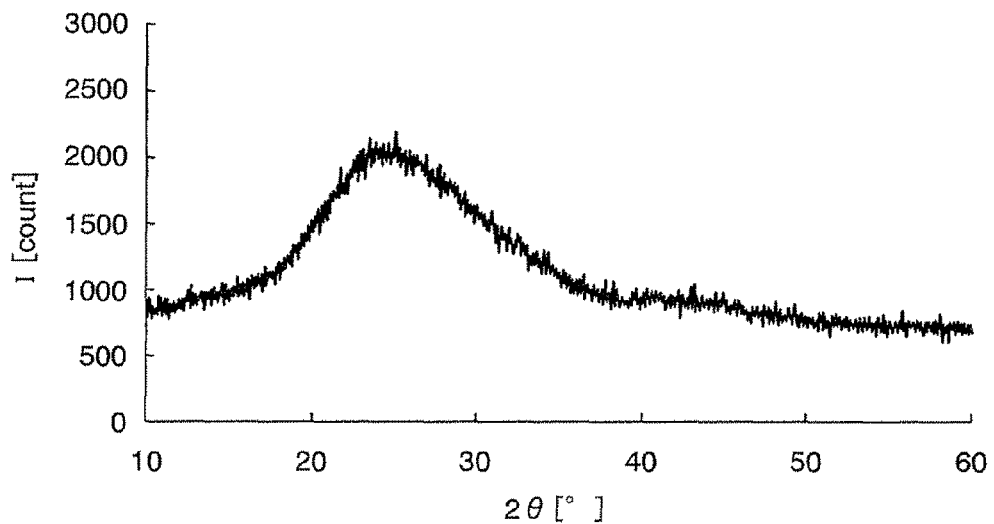
FIG. 1 is a chart showing the X-ray diffraction pattern of amorphous iron oxide.
Figure 2:
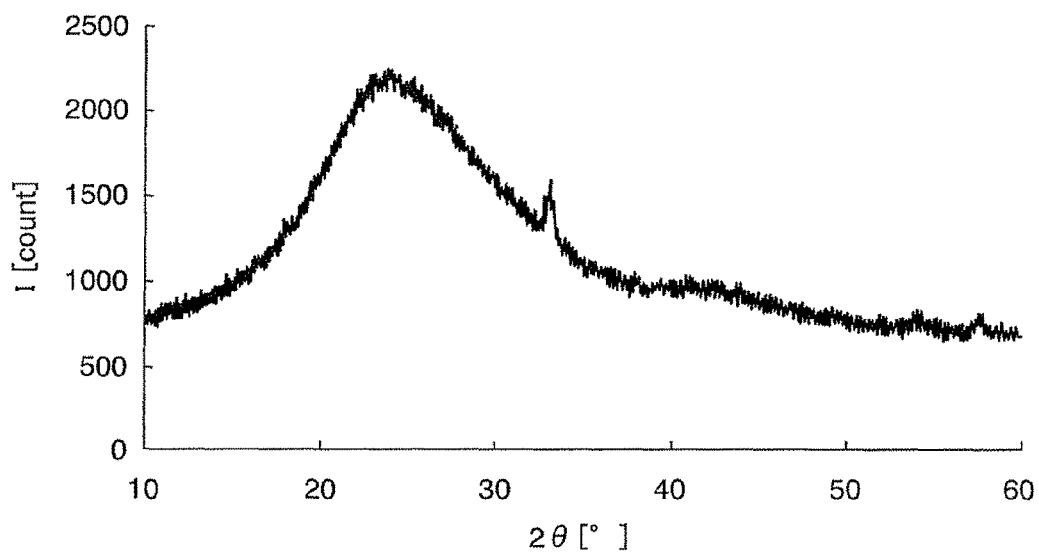
FIG. 2 is a chart showing the X-ray diffraction pattern of crystalline iron oxide.

The crystallinity of Analysis Sample 1 and that of Analysis Sample 2 were evaluated by X-ray diffractometry. The X-ray diffraction pattern of Analysis Sample 1 is shown in FIG. 1, and that of Analysis Sample 2, in FIG. 2. The diffraction pattern in FIG. 1 is a broad continuum without peak. It can thus be understood that the iron oxide is amorphous. On the other hand, peaks are observed at around 32° and 58° on the diffraction pattern in FIG. 2. It is thus understood that crystalline iron oxide was formed on the glass substrate.

As described above, in the present invention, whether or not a metallic element has been oxidized to a metal oxide can be confirmed by a composition analysis, and whether the metal oxide is amorphous or crystalline can be confirmed by its X-ray diffractometer recording.

Alkaline Metal Ion Intercalation and Deintercalation Reactions:

Furthermore, the metal oxide in the present invention must not cause alkaline metal ion intercalation and deintercalation reactions. This means that the metal oxide must not electrochemically react with an alkaline metal ion such as lithium ion. If the metal oxide electrochemically reacts with an alkaline metal ion, the reaction entails expansion of the metal oxide, or yields a reaction product. The electrode active material containing the metal oxide that does not chemically react with an alkaline metal ion is thus prevented from deterioration that occurs due to the expansion of the metal oxide, the defect of the electrode active material layer, etc.

An electrochemical measuring method (cyclic voltammetry: CV) can be used to judge whether or not the metal oxide causes lithium ion intercalation and deintercalation reactions.

Figure 4:
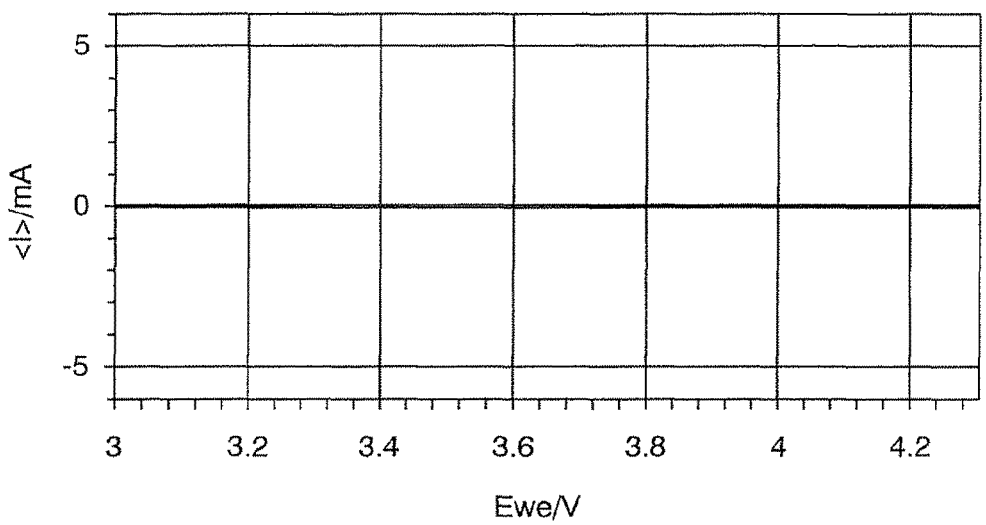
FIG. 4 is a cyclic voltammogram obtained from a cyclic voltammetry test made on a metal oxide that does not cause lithium ion intercalation and deintercalation reactions.

Explanation of a CV test will be given below. Specifically, the measurement is carried out by repeating about three times the operation of sweeping the electrode potential within the voltage range optimal to the active material, e.g., from 3.0 V to 4.3 V if the alkaline metal is lithium ion, and the metal oxide is $LiMn_2O_4$, and returning it to 3.0 V. In this operation, the scanning rate is preferably 1 mV/sec. In the case of $LiMn_2O_4$, a peak representing oxidation that is equivalent to the lithium deintercalation reaction of $LiMn_2O_4$ appears at around 3.9 V, and a peak representing reduction that is equivalent to the lithium intercalation reaction of $LiMn_2O_4$ appears at around 4.1 V. In this manner, it is possible to judge whether or not the metal oxide causes lithium ion intercalation and deintercalation reactions. If no peak appears as in FIG. 4, it can be judged that the metal oxide does not cause lithium ion intercalation and deintercalation reactions.

In the present invention, that the metal oxide does not cause lithium ion intercalation and deintercalation reactions does not mean that the metal oxide has this feature as its inherent electrical property, but means that the metal oxide present in the electrode active material layer as a binding material does not cause lithium ion intercalation and deintercalation reactions in a range of voltage suitable for the particulate electrode active material in the electrode active material layer. This is because it is important for the electrode plate that the metal oxide intercalates and deintercalates substantially no lithium ion.

Before producing the electrode plate for a non-aqueous electrolyte secondary battery of the present invention, whether or not the metal oxide that will be formed in the electrode active material layer causes lithium ion intercalation and deintercalation reactions can be checked in the above-described manner. It is therefore possible to allow a metal oxide that has been checked beforehand that it does not cause lithium ion intercalation and deintercalation reactions to exist in the electrode active material layer as a binding material. On the other hand, whether or not a metal oxide that does not cause lithium ion intercalation and deintercalation reactions is present in the electrode active material layer in the completed electrode plate can be checked in the following manner, for example. A sample obtained by scraping the electrode active material layer off the current collector is subjected to a composition analysis, and from the result of the analysis, it is possible to estimate what metal oxide is present in the sample. A film of the estimated metal oxide is formed on a substrate such as a glass plate. By subjecting this laminate to a cyclic voltammetry test, it is possible to judge whether the metal oxide causes lithium ion intercalation and deintercalation reactions or not.

Conductive Material:

A conductive material may be optionally incorporated in the electrode active material layer in the electrode plate of the invention. In general, incorporation of a conductive material in an electrode active material layer makes electron conduction between an electrode active material in the electrode active material layer and a current collector better, and can efficiently decrease the volume resistivity of the electrode active material layer itself. It is therefore desirable to incorporate a conductive material in the electrode active material layer. Examples of the conductive material useful herein include those conductive materials that are usually used in electrode plates for non-aqueous electrolyte secondary batteries, e.g., conductive carbonaceous materials such as particulate carbon blacks, e.g., acetylene black and ketjen black. It is preferred that the mean primary particle diameter of the conductive material be from about 20 to 50 nm. Another known conductive material useful herein is carbon fiber such as VGCF. The carbon fiber can conduct electricity lengthwise very well and can improve the flow of electricity. The length of the fiber is from about 1 μm to 20 μm. It is therefore possible to obtain the improved effect of the addition of a conductive material by the combination use of carbon fiber and the above-described particulate conductive material such as acetylene black. Electrical resistance is usually used to express the conductivity of a conductive material; the above conductive materials have electrical resistance values of about 0.14 to 0.25 Ωcm.

The mean primary particle diameter of the particles of a conductive material is the arithmetic mean value of the particle diameters actually measured with an electron microscope as in the measurement of the particle diameter of a particulate active material.

Although the conductive material may optionally be incorporated in the electrode active material layer in any amount, it is usually used in an amount of 5 parts by weight or more and 20 parts by weight or less for 100 parts by weight of the particulate electrode active material.

It is desirable that carbonic matter, other than the particulate electrode active material made of a carbonaceous material such as graphite and a conductive carbonic material such as the above conductive material that is optionally added, be not present in the electrode active material layer in the present invention.

In order to make substantially no carbonic matter present in the electrode active material layer in the present invention, it is desirable to use materials containing no carbonic matter as the ingredients of the electrode active material layer-forming composition. The use of materials containing no carbonic matter, however, is not the only means for making no carbonic matter present in the electrode active material, and even when the electrode active material layer contains an organic material such as an organometallic compound that serves as a material for forming a metal oxide, it is possible to eliminate non-conductive carbon from the electrode active material layer that is formed in the heating step, by performing the heating step at a proper heating temperature or in a proper heating atmosphere.

More specifically, a preliminary experiment is carried out in the following manner: an electrode active material layer-forming composition to which carbonaceous materials such as a conductive material and a particulate cathode active material made of graphite are not added yet is applied to a substrate, and the coating film thus formed on the substrate is heated at a proper temperature or in a proper heating atmosphere. In this manner, it is preliminarily confirmed that no carbonic matter is present in the film (carbonic matter is eliminated). Subsequently, an electrode active material layer-forming composition containing all the necessary materials is applied to a current collector, and is then heated under the same conditions as in the preliminary experiment, whereby there can be obtained an electrode plate in which carbonic matter other than the carbonaceous materials such as the conductive material and the particulate cathode active material made of graphite does not remain.

In the present invention that uses a metal oxide as a binding material, it is possible to provide an electrode plate extremely excellent in the adhesion between a current collector and an electrode active material layer by not allowing carbonic matter to exist in the electrode active material layer as is mentioned above. The electrode plate of the present invention, therefore, does not suffer the trouble that the electrode active material layer peels off the current collector even if the electrode plate is used under severe conditions. Moreover, in the process of producing a non-aqueous electrolyte secondary battery with the use of the electrode plate, or in the process of transporting the electrode plate, the surface of the electrode active material layer does not peel off the current collector even partially even when it comes in contact with something physically.

Other Additives:

The electrode active material layer in the present invention contains at least the above-described particulate electrode active material and metal oxide serving as a binding material, and a conductive material may be optionally added to these ingredients. The electrode active material layer may further optionally contain any other additives within the scope of the present invention.

(Current Collector)

Any current collector that is usually used as an electrode current collector in an electrode plate for a non-aqueous electrolyte secondary battery can be used herein. For example, aluminum foil, nickel foil, or the like can be used as an anode current collector; and copper foil, aluminum foil, nickel foil, or the like can be favorably used as a cathode current collector.

The current collector in the present invention can have any thickness that is practicable for the current collector of a conventional electrode plate for a non-aqueous electrolyte secondary battery. It is, however, preferred that the thickness of the current collector be from 10 to 100 µm, more preferably from 15 to 50 µm.

(Method for Evaluating Charge & Discharge Rate Characteristics of Electrode)

The output and input characteristics of an electrode plate of the present invention can be evaluated by the percentage of discharge capacity retention. In other words, the percentage of discharge capacity retention can be used to evaluate discharge rate characteristics, and it is generally understood that an electrode plate improved in discharge rate characteristics is improved also in charge rate characteristics. It is therefore considered that an electrode plate showing a desirable percentage of discharge capacity retention is improved in charge and discharge rate characteristics and is thus improved in output and input characteristics. More specifically, the percentage of discharge capacity retention can be obtained in the following manner. The discharge rate 1 C is set so that the theoretical discharge capacity (mAh/g) of the active material can be completely discharged in 1 hour, and the discharge capacity value (mAh/g) actually measured at the discharge rate 1 C is taken as 100% discharge capacity retention. The discharge capacity values (mAh/g) are measured at increased discharge rates. Using the following Equation 1, the percentage of discharge capacity retention at each discharge rate is calculated.

The above discharge capacity can be obtained by measuring the discharge capacity of an electrode itself with the use of a three-electrode coin cell having the electrode.

$$[\text{percentage of discharge capacity retention (\%)}] = \frac{[\text{discharge capacity at each discharge rate (mAh/g)}]}{[\text{discharge capacity at } 1C \text{ (mAh/g)}]} \times 100 \quad [\text{Equation 1}]$$

The charge and discharge rate characteristics of an electrode plate of the invention vary depending on the type and particle diameter of the particulate electrode active material used for the electrode active material layer, the amount of the metal oxide serving as a binding material, present in the electrode active material layer, the thickness of the electrode active material layer, and so forth. In general, as for the charge and discharge rate characteristics of an electrode plate for a non-aqueous electrolyte secondary battery, it is desirable that the percentage of discharge capacity retention be 50% or more at a discharge rate of 50 C or more, and it is more desirable that the percentage of discharge capacity retention be 50% or more at a discharge rate of 100 C or more. An electrode plate showing a percentage of discharge capacity retention in the above range is rated as good in charge and discharge characteristics. An electrode plate of the present invention can show the above-described high charge and discharge rate characteristics. It should be noted, however, that a discharge rate of 2000 C or more demands a system capable of withstanding heavy current.

Further, if the charge and discharge rate characteristics of an electrode plate for a non-aqueous electrolyte secondary battery are evaluated from another point of view, it can generally be said that a higher percentage of discharge capacity retention is more desirable. It is desirable that the percentage of discharge capacity retention be 50% or more, preferably 80% or more, more preferably 100%, at a discharge rate of 50 C. An electrode plate for a non-aqueous electrolyte secondary battery of the present invention can show such a high percentage of discharge capacity retention.

[Method for Producing Electrode Plate for Non-Aqueous Electrolyte Secondary Battery]

Next, the method for producing an electrode plate for a non-aqueous electrolyte secondary battery according to the present invention (hereinafter sometimes referred to simply as the "production method of the present invention") will be described below.

The production method of the present invention comprises the steps of applying an electrode active material layer-forming composition containing at least a particulate electrode active material and a metallic-element-containing compound for forming a metal oxide that serves a binding material, containing one, or two or more metallic elements, to at least part of the surface of a current collector, thereby forming a coating film on the current collector, and heating the coating film so as to evaporate a solvent and to decompose thermally and oxidize the metallic-element-containing compound to an amorphous metal oxide, thereby forming, on the current collector, an electrode active material layer that contains the metal oxide and the particulate electrode active material and that is formed by the particulate active material fixed to the current collector by means of the metal oxide.

Before preparing the electrode active material layer-forming composition, a metallic-element-containing compound capable of forming, in the heating step, a metal oxide that does not cause alkaline metal ion intercalation and deintercalation reactions is selected as the above metallic-element-containing compound.

A temperature that is equal to or higher than the temperature at which the metallic-element-containing compound begins to decompose thermally, and that is less than the crystalline temperature of the metal oxide that is formed in the heating step is selected as the heating temperature in the heating step.

In the present invention, it is possible to use, as the metallic-element-containing compound, an organometallic compound that contains carbon. In any case, the heating temperature, and when necessary, the heating atmosphere, in the heating step should be controlled so that carbonic matter distinct from conductive materials may not remain in the electrode active material layer formed on the current collector.

Moreover, in the production method of the present invention, when a material containing carbon is used as an optional ingredient of the electrode active material layer-forming composition, other than the particulate electrode active material and the metallic-element-containing compound, attention should be paid so that the carbon may not remain in the electrode active material layer as carbonic matter distinct from conductive materials. Carbon that can make up carbonic matter distinct from conductive materials has to be eliminated thermally by properly controlling the heating temperature or the heating atmosphere in the heating step. In this case, although any heating atmosphere can be used, it is desirable to use a hydrogen-reduction atmosphere.

Such materials as the conductive material and the particulate cathode active material made of graphite that are usually used for an electrode plate for a non-aqueous electrolyte secondary battery do not come under "the carbonic matter distinct from conductive materials", so that the presence of these materials in the electrode active material layer-forming composition or in the electrode active material layer formed from the composition causes no harm. The production method of the present invention will be described hereinafter more specifically.

Particulate Electrode Active Material:

The particulate electrode active material that is incorporated in the electrode active material layer-forming composition is the same as the one described above, so that its explanation is not given here. In the production method of the present invention, a selection of particle diameter for the particulate electrode active material can be made as desired; this is the same as in the above description.

Binding-Material-Forming Material:

In the electrode active material layer-forming composition, a metallic-element-containing compound is incorporated as a material for forming the intended metal oxide. The metallic-element-containing compound that includes an organometallic compound will be sometimes referred to as a binding-material-forming material in the following description.

The binding-material-forming material, which is contained in the electrode active material layer, is a material for forming a binding material that acts to fix the particulate electrode active material to a current collector.

The binding-material-forming material is decomposed thermally and oxidized to form a film, when it is heated on a substrate at a temperature equal to or more than the temperature at which the binding-material-forming material begins to decompose thermally. In an attempt to form a thin film of a metal oxide on a substrate, the inventors studied incorporation of a particulate electrode active material in a metal oxide film, and found that the particulate electrode active material can be fixed to the substrate owing to the presence of the metal oxide even if the amount of the metal oxide is decreased. On the basis of the idea of using no resin binder and adding a particulate electrode active material to the above binding material capable of forming a film, the inventors prepared a composition containing a binding-material-forming material and a particulate electrode active material, applied the composition to a current collector, and heated it. As a result, the inventors found that the particulate electrode active material can be fixed to the current collector even when the binding material formed on the current collector is in such a significantly decreased amount that the binding material is present in the electrode active material layer composed chiefly of the particulate electrode active material.

Any material can be selected within the scope of the invention as the binding-material-forming material for use in the production method of the present invention, as long as it contains a metallic element, can be thermally decomposed and oxidized to form a film, and forms, on a current collector, a binding material that does not cause alkaline metal ion (e.g., lithium ion) intercalation and deintercalation reactions.

That a binding material to be formed from a binding-material-forming material to be used does not cause alkaline metal ion intercalation and deintercalation reactions can be confirmed beforehand by a preliminary experiment that is carried out in the following manner: a solution containing the binding-material-forming material is applied to a substrate and is then heated, thereby forming a coating film containing the binding material, and this laminate is subjected to the above-described cyclic voltammetry test.

[Metallic-Element-Containing Compound]

Specifically, any compound containing one, or two or more metallic elements selected from the group consisting of Li, Be, Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Hg, Tl, Pb, Bi, Fr, Ra, Ce, etc. can be used herein as the metallic-element-containing compound.

Although the reason is not clear, the use of a metallic-element-containing compound containing a metallic element of groups 3 to 5 of the periodic table, among the above-enumerated metallic elements, tends to provide an electrode plate more improved in output and input characteristics. In other words, it is preferable to use a metallic-element-containing compound containing one, or two or more metallic elements selected from the group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn.

Further, e.g., a metal salt is favorably used herein as the metallic-element-containing compound containing the above metallic element(s). Examples of the metal salt include chlorides, nitrates, sulfates, perchlorates, phosphates and bromates. Of these, chlorides and nitrates are preferably used herein because they are readily available as general-purpose products. Since nitrates are inexpensive, their use is particularly preferred.

Specific examples of the metal salt include magnesium chloride, aluminum nitrate, aluminum chloride, calcium chloride, titanium tetrachloride, vanadium oxysosulfate, ammonium chromate, chromium chloride, ammonium dichromate, chromium nitrate, chromium sulfate, manganese nitrate, manganese sulfate, iron (I) chloride, iron (III) chloride, iron (III) nitrate, iron (II) sulfate, ammonium iron (III) sulfate, cobalt chloride, cobalt nitrate, nickel chloride, nickel nitrate, copper chloride, copper nitrate, zinc chloride, yttrium nitrate, yttrium chloride, zirconium oxide chloride, zirconium oxide nitrate, zirconium tetrachloride, silver chloride, indium nitrate, tin sulfate, cerium chloride, cerium nitrate, cerium diammonium nitrate, cerium sulfate, samarium chloride, samarium nitrate, lead chloride, lead nitrate, lead iodide, lead phosphate, lead sulfate, lanthanum chloride, lanthanum nitrate, gadolinium nitrate, strontium chloride, strontium nitrate, niobium pentachloride, ammonium molybdenate phosphate, molybdenum sulfate, paradium chloride, paradium nitrate, antimony pentachloride, antimony trichloride, antimony trifluoride, telluric acid, barium sulfite, barium chloride, barium chlorinate, barium perchlorinate, barium nitrate, tungstenic acid, ammonium tungstenate, tungsten hexachloride, tantalum pentachloride, hafnium chloride, and hafnium sulfate.

In the present invention, an organometallic compound that is composed of metal and carbon may be used as the metallic-element-containing compound. Both metal complexes containing element carbon and metal salts containing element carbon are included in the organometallic compound.

More specifically, the organometallic compound may be any compound containing one, or two or more metallic elements selected from the metallic elements enumerated above as examples of the metallic-element-containing compound, and carbon. Of the metallic elements of the above group, a metallic element of groups 3 to 5 of the periodic table is particularly preferred as a component of the organometallic compound, and this is the same as in the case of the metallic-element-containing compound.

Examples of the above metal salt include acetates and oxalates. Of these, acetates are preferably used herein because they are readily available as general-purpose products.

Specific examples of the metal salt include scandium acetate, chromium acetate, iron (II) acetate, cobalt acetate, nickel acetate, zinc acetate, silver acetate, indium acetate, cerium acetate, cerium oxalate, lead acetate, lanthanum acetate, strontium acetate, paradium acetate, and barium acetate.

Examples of the metal complex include magnesium diethoxide, aluminum acetylacetonate, calcium acetylacetonate dihydrate, calcium di(methoxyethoxide), calcium gluconate monohydrate, calcium succinate tetrahydrate, calcium salicylate dihydrate, titanium lactate, titanium acetylacetonate, tetraisopropyl titanate, tetranormalbutyl titanate, tetra (2-ethylhexyl) titanate, butyl titanate dimer, titanium bis(ethylhexoxy)bis(2-ethyl-3-hydroxyhexoxide), diisopropoxytitanium bis(triethanolaminate), dihydroxybis (ammoniumlactate) titanium, diisopropoxy titanium bis (ethylacetoacetate), titanium ammonium peroxosuccinate tetrahydrate, dicyclopentadienyl iron (II), iron (II) lactate trihydrate, iron (III) acetylacetonate, cobalt (II) acetylacetonate, nickel (II) acetylacetonate dihydrate, copper (II) acetylacetonate, copper (II) dipivaloyl methanate, copper (II) ethylacetoacetate, zinc acetylacetonate, zinc lactate trihydrate, zinc salicylate trihydrate, zinc stearate, strontium dipivaloyl methanate, yttrium dipivaloyl methanate, zirconium tetra-n-buthoxide, zirconium (IV) ethoxide, zirconium n-propylate, zirconium n-butylate, zirconium tetraacetylacetonate, zirconium monoacetylacetonate, zirconium acetylacetonate bis-ethylacetoacetate, zirconium acetate, zirconium monostearate, penta-n-buthoxy niobium, pentaethoxy niobium, pentaisopropoxy niobium, indium (III) tris(acetylacetonate), indium (III) 2-ethylhaxanate, tetraethyl tin, dibutyl tin (IV) oxide, tricyclohexyl tin (IV) hydroxide, lanthanum acetylacetonate dihydrate, tri(methoxyethoxy) lanthanum, pentaisopropoxy tantalum, pentaethoxy tantalum, tantalum (V) ethoxide, cerium (III) acetylacetonate n.hydrate, lead (II) succinate trihydrate, and lead cyclohexane lactate.

Besides the binding-material-forming materials specifically enumerated above, other materials that can be defined as compounds containing metallic elements can be used within the scope of the present invention. In other words, any material can be used for an electrode active material layer that is formed when producing an electrode plate for a non-aqueous electrolyte secondary battery by the method of the present invention, as long as it can form a metal oxide that serves as a binding material capable of fixing a particulate electrode active material to a current collector.

Furthermore, in the electrode active material layer-forming composition, a conductive material, an organic material that serves as a viscosity modifier for the electrode active material layer-forming composition, and other additives may be incorporated within the scope of the present invention. Specific examples of the organic material include urethane resin, epoxy resin, ethyl cellulose, starch, polyethylene oxide, polyvinyl alcohol, and polyethylene glycol. If the organic material incorporated in the electrode active material layer-forming composition will remain, as carbonic matter distinct from conductive materials, in the electrode active material layer to be formed, it is necessary to control the heating conditions so that the carbonic matter is eliminated in the heating step, as in the case of the organometallic compound.

Solvent:

Any solvent can be used in the electrode active material layer-forming composition, as long as it can provide a composition containing the particulate electrode active material, the binding-material-forming material, and other additives, and moreover, can be removed, in the heating step, from the composition applied to a current collector. The solvent that can be used to prepare the electrode active material layer-forming composition is a solvent selected from lower alcohols having five or less carbon atoms, such as methanol, ethanol, isopropanol, propanol, and butanol; diketones such as acetylacetone, diacetylacetone, and benzoylacetone; ketoesters such as ethyl acetoacetate, ethyl pyruvate, ethyl benzoyl acetate, and ethyl benzoyl formate; toluene; and the like, or a solvent mixture of two or more solvents selected from the above-enumerated ones.

Before preparing the electrode active material layer-forming composition, the amount of the particulate electrode active material to be used, that of the binding-material-forming material to be used, and those of other optional additives to be used are determined so that the electrode active material layer that will be formed on a current collector can contain these ingredients in necessary amounts. In determining the above amounts, the solid matter content of the electrode active material layer-forming composition is properly adjusted in consideration of the coating properties that the composition exhibits when it is applied to a current collector in the application step, as well as the removability of the solvent in the heating step. In general, the electrode active material layer-forming composition is prepared so that it has a solid matter content of 30 to 70% by weight.

Application Step:

Next, explanation of the step of applying the electrode active material layer-forming composition prepared in the above-described manner to a current collector, thereby forming a coating film on the current collector, will be given hereinafter. The current collector that is used in the production method of the present invention is the same as the current collector that is used in the aforementioned electrode plate for a non-aqueous electrolyte secondary battery, so that its explanation is not given here.

To apply the electrode active material layer-forming composition to a current collector in the application step, there can be used any method selected from known methods of application. For example, the electrode active material layer-forming composition can be applied to any part of the surface of a current collector by means of printing, spin coating, dip coating, bar coating, spray coating, or the like, thereby forming a coating film. If the surface of a current collector is porous, or has a large number of irregularities, or is three-dimensional, the application of the electrode active material layer-forming composition can be done also by hand. It is preferable to subject the current collector beforehand to such surface treatment as corona discharge treatment or oxygen plasma treatment, as needed, because if the surface of the current collector has been so treated, the electrode active material layer can show more improved film-forming properties.

The amount of the electrode active material layer-forming composition to be applied to the current collector may be determined freely in consideration of the intended use of the electrode plate to be produced, and the like. In the present invention, it is possible to make the electrode active material layer extremely thin, as mentioned above. If a thinner electrode active material layer is desired, the electrode active material layer-forming composition may be applied thinly so that the composition forms an electrode active material layer with a thickness of about 300 nm to 11 µm in the heating step that will be described later. By applying the electrode active material layer-forming composition to a current collector in the above-described manner, there is formed an electrode active material layer-forming coating film (hereinafter sometimes referred to simply as a "coating film") containing at least the particulate electrode active material and the metallic-element-containing compound, binding-material-forming material.

Heating Step:

Next, the step of heating the coating film formed in the above application step will be explained. The heating step is performed for the purposes of heating and thermally decomposing the binding-material-forming material in the coating film into an amorphous metal oxide containing a metallic element that is a component of the binding-material-forming material, and of removing the solvent from the coating film.

In the heating step, any means of heating or heating device can be used, as long as it can heat the coating film at a desired heating temperature. Specifically, one of, or a combination of two or more of, such heating devices as a hot plate, an oven, a heating furnace, an infrared heater, a halogen heater and a hot air blower can be used. When the current collector is planar, it is preferable to use a hot plate or the like. When a hot plate is used for heating, it is preferred that the current collector coated with the coating film be heated with the coating film side not facing the heating surface of the hot place.

For the heating step, a temperature that is equal to or more than the temperature at which the binding-material-forming material begins to decompose thermally, and that is less than the crystallization temperature of the metal oxide that is formed in the heating step is selected as the heating temperature.

The temperature at which the binding-material-forming material begins to decompose thermally varies depending on the type of the compound used as the binding-material-forming material.

When the metallic-element-containing compound contained in the coating film is heated and thermally decomposed, it is usually oxidized to a metal oxide rapidly. Whether a metal oxide has been formed or not can be judged by a preliminary experiment that is carried out in the following manner: a solution containing the metallic-element-containing compound is applied to a substrate, and then heated, thereby forming a film on the substrate; a sample is obtained by scraping the film off the substrate and is subjected to a composition analysis, thereby determining the metallic element content and the oxygen content. If the result of the composition analysis shows that a metal oxide has been formed, it can be said that the metallic-element-containing compound has been heated on the substrate at a temperature equal to or more than the temperature at which the compound begins to decompose thermally. Heating in the above preliminary experiment is conducted in the same heating atmosphere as the one that is supposed to be used in this production method. It can thus be understood that "the temperature at which a metallic-element-containing compound begins to decompose thermally" is the temperature at which the metallic-element-containing compound is thermally decomposed when heated, and oxidation of the metallic element contained in the metallic-element-containing compound begins.

In the present invention, the "crystallization temperature" refers to the temperature at which, after a metal atom present in the electrode active material layer-forming composition has been oxidized to a metal oxide, the metal oxide crystallizes. The metal oxide crystallizes at its crystallization temperature, and the degree of crystallinity increases as the temperature exceeds the crystallization temperature. In the present invention, however, "crystallization" means that a peak representing the crystalline state is observed on an X-ray diffraction pattern, irrespective of the degree of crystallinity.

The "crystallization temperature" of a metal oxide in the present invention does not always agree with the inherent crystallization temperature of the metal oxide, and is sometimes slightly different from the inherent crystallization temperature depending on the state of the metal oxide in the electrode active material layer-forming composition. In consideration of this point, it is desirable to check beforehand the crystallization temperature of the metal oxide in a coating film that will become an electrode active material layer.

On the other hand, when the heating temperature is "less than the crystallization temperature" of the metal oxide to be formed in the heating step, the metal oxide can remain amorphous in the electrode active material layer formed on a current collector. Whether a film of a metal oxide has been heated at a temperature less than the crystallization temperature of the metal oxide can be judged by carrying out a preliminary experiment in the following manner. A solution containing a binding-material-forming material is applied to a substrate, and then heated at a temperature equal to or more than the temperature at which the binding-material-forming material begins to decompose thermally, thereby forming a metal oxide film on the substrate. A sample is obtained by scraping the film off the substrate, and its crystallinity is evaluated by X-ray diffractometry, using an X-ray diffractometer. If no peak representing the crystalline state is observed on the X-ray diffraction pattern of the sample, it can be understood that the film has been heated at a temperature less than the crystallization temperature of the metal oxide.

There is a case where the electrode active material layer contains conductive carbonic matter such as a particulate cathode active material made of graphite or a conductive material, but the presence of such carbonic matter is not regarded that carbonic matter distinct from active materials and conductive materials is present. In the case where a carbon-containing material, such as an organometallic compound or an organic material that serves as a viscosity modifier, is incorporated in an electrode active material layer-forming composition, the heating conditions are controlled by selecting a heating temperature in the heating step so that carbonic matter distinct from conductive materials does not remain in the electrode active material layer to be formed, and that the carbon contained in the electrode active material layer-forming composition can be eliminated.

More specifically, when an electrode active material layer for an electrode plate of the present invention is formed with the use of an electrode active material layer-forming composition containing at least a particulate electrode active material and a metallic-element-containing compound, the heating temperature in the heating step is set to a temperature that is equal to or more than the temperature at which the binding-material-forming material beings to decompose thermally, and that is less than the crystallization temperature of the metal oxide that is formed in the heating step.

Especially when the binding-material-forming material is an organometallic compound, or when an organic material is present as an additive, the heating temperature is set to such a temperature that carbon originating from the organometallic compound or from the organic material can be eliminated, in order that the carbon does not remain in the electrode active material layer as carbonic matter distinct from conductive materials. Alternatively, it is possible to eliminate the carbon in the following manner. The heating step is divided into two, the first heating step and the second heating step. In the first heating step, heating is conducted at a temperature at which an amorphous metal oxide can be formed, and in the second heating step, heating is conducted in a hydrogen-reduction atmosphere. Through this means, carbon that can be carbonic matter distinct from conductive materials can be converted into methane gas at a temperature of around 500° C., thereby eliminating the carbon.

Among the carbonic matter contained in the electrode active material layer-forming composition, the conductive material, etc. that are conductive carbonic matter remain as they are in the electrode active material layer.

A suitable heating temperature varies depending on the binding-material-forming material used, or on the combination of the ingredients of the electrode active material layer-forming composition. It is therefore desirable to select, by carrying out a preliminary experiment, a heating temperature beforehand so that the desired substances can remain in the electrode active material layer.

When making the selection of a heating temperature for the heating step, it is desirable to take the heat resistance of the current collector, that of the particulate electrode active material, and that of the conductive material into due consideration. For example, the heat resistance of copper foil, which is usually used as a current collector for a cathode plate, is around 200° C. since it undergoes oxidation in an atmosphere of air, and around 1080° C. in an atmosphere of an inert gas. The heat resistance of aluminum foil is around 660° C. If the heating temperature is in excess of the temperature to which the current collector can withstand, the current collector may be damaged.

The heating step may be performed in any atmosphere, and the selection of an atmosphere may be made in consideration of the materials that are used for producing an electrode plate, the heating temperature, the oxygen potential of the metallic element, and so forth.

For example, when the heating step is performed in an atmosphere of air, it is not necessary to control the atmosphere specially, and the heating step can thus be conducted with ease. From this point of view, the use of an atmosphere of air is preferred. In the case where aluminum foil is used as a current collector, the heating step can be performed successfully in an atmosphere of air because there is no possibility that aluminum foil undergoes oxidation in an atmosphere of air even when heated.

On the other hand, when copper foil is used as a current collector, the use of an atmosphere of air is not desirable since copper foil is oxidized in the heating step if the heating step is conducted in an atmosphere of air. In this case, it is preferable to conduct the heating step in an atmosphere of an inert gas, of a reducing gas, or of a gas mixture of an inert gas and a reducing gas. It should be noted that when the heating step is performed, for forming a metal oxide in the electrode active material layer, in an atmosphere with an insufficient oxygen gas content, the metallic element in the metallic-element-containing compound has to combine with oxygen contained in the compounds in the electrode active material layer-forming composition to cause oxidation. In this case, the use of compounds containing element oxygen is required.

In the production method of the present invention, any known atmosphere such as an atmosphere of an inert gas or of a reducing gas can be used to perform the production method. Examples of the atmosphere of an inert gas include an atmosphere of argon gas and that of nitrogen gas; and examples of the atmosphere of a reducing gas include an atmosphere of hydrogen gas, that of carbon monoxide gas, and that of a gas mixture of an inert gas and a reducing gas. In order not to allow carbonic matter distinct from conductive materials to remain in the electrode active material layer, it is preferable to perform the heating step in a hydrogen-reduction atmosphere, thereby eliminating the carbonic matter.

[Non-Aqueous Electrolyte Secondary Battery]

A non-aqueous electrolyte secondary battery 10 usually comprises an anode 16 with an anode plate 17, a cathode 14 with a cathode plate 15, and a separator 13 made of a polyethylene porous film or the like, placed between the anode plate 17 and the cathode plate 15, as shown in FIG. 9(a). The cathode 14 with the cathode plate 15, the anode 16 with the anode plate 17, and the separator 13 are contained within a container 11. The container 11 is sealed with its inside filled with a non-aqueous electrolyte (electrolyte) 19.

(Electrode Plate)

The characteristic feature of a non-aqueous electrolyte secondary battery of the present invention is that it uses the above-described electrode plate of the invention as the anode plate and/or the cathode plate. The electrode plate of the present invention is extremely excellent in output and input characteristics, as mentioned above. A non-aqueous electrolyte secondary battery of the invention, using such an electrode plate, therefore, is to exhibit improved output and input characteristics as well.

In the non-aqueous electrolyte secondary battery of the present invention, when an electrode plate of the invention is used only for the anode plate, a conventional cathode plate for a non-aqueous electrolyte secondary battery can be used for the cathode plate. Usually used as the cathode plate is a conventional one obtained by applying a cathode active material layer-forming composition to at least part of the surface of a current collector made of e.g., copper foil, such as electrolytic or rolled copper foil, with a thickness of about 5 to 50 µm, and drying the applied composition, followed by pressing, if necessary. The cathode active material layer-forming composition usually contains a particulate cathode active material such as an active material made of natural graphite, synthetic graphite, amorphous carbon, carbon black, or a carbonaceous material obtained by adding other elements to the above material, or a material capable of occluding and releasing lithium ion, such as metallic lithium, a lithium alloy, tin, silicon, a tin alloy, or a silicon alloy; and a resin binder; and, if necessary, additives such as a conductive material. It is however possible to use other cathode active material layer-forming compositions.

In the non-aqueous electrolyte secondary battery of the present invention, when an electrode plate of the invention is used only for the cathode plate, a known anode plate for a non-aqueous electrolyte secondary battery can be used for the anode plate. Usually used as the anode plate is a conventional one obtained by applying an anode active material layer-forming composition to at least part of the surface of a current collector made of e.g., aluminum foil with a thickness of about 5 to 50 µm, and drying the applied composition, followed by pressing, if necessary. The anode active material layer-forming composition usually contains a particulate anode active material such as a lithium-transition metal double oxide, e.g., $LiCoO_2$, $LiMn_2O_4$, $LiNiO_2$, $LiFeO_2$, $Li_4Ti_5O_{12}$ or $LiFePO_4$, and a resin binder, and if necessary, additives such as a conductive material. It is however possible to use other anode active material layer-forming compositions.

(Non-Aqueous Electrolyte)

Although any non-aqueous electrolyte that is usually used for a non-aqueous electrolyte secondary battery can be used in the present invention, it is preferable to use a non-aqueous electrolyte prepared by dissolving a lithium salt in an organic solvent.

Typical examples of the lithium salt include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_4F_9$, $LiOSO_2C_5F_{11}$, $LiOSO_2C_6F_{13}$ and $LiOSO_2C_7F_{15}$.

Examples of the organic solvent useful for dissolving a lithium salt include cyclic esters, chain esters, cyclic ethers, and chain ethers.

Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone.

Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane.

Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

A suitable structure selected from conventional ones may be used as the structure of the battery (cell) that is produced with the use of the above-described anode plate, cathode plate, separator, and non-aqueous electrolyte. For example, the following structure can be adopted: an anode plate and a cathode plate are spirally wound up with a separator made of a polyethylene porous film or the like between the two electrode plates, and this one is placed in a battery (cell) container. Another possible embodiment is as follows: an anode plate and a cathode plate that have been cut into a desired shape are layered over each other with a separator between the two electrode plates and are bound together, and this one is placed in a battery (cell) container. In either structure, after placing the anode plate and the cathode plate in the battery (cell) container, lead wire attached to the anode plate is connected to an anode terminal provided on an outer container. On the other hand, lead wire attached to the cathode plate is connected to a cathode terminal provided in the outer container. The battery container is filled with a non-aqueous electrolyte and sealed, whereby a non-aqueous electrolyte secondary battery is produced.

EXAMPLES

Example 1

A starting solution for forming a metal oxide that does not cause lithium ion intercalation and deintercalation reactions was prepared by adding 9.0 g of $Fe(NO_3)_3 \cdot 9H_2O$ [molecular weight: 404], metallic-element-containing compound, to 17 g of methanol, and blending this mixture with 10 g of ethylene glycol. Subsequently, to the starting solution were added 10 g of $LiMn_2O_4$ with a mean particle diameter of 4 µm, anode active material, 1.5 g of acetylene black ("Denka Black" manufactured by Denki Kagaku Kogyo K.K., Japan) and 0.1 g of carbon fiber ("VGCF" manufactured by Showa Denko K.K., Japan), and the mixture was kneaded with a homogenizer ("Excel Autohomogenizer" manufactured by NIHON SEIKI KAISHA, Japan) at 7000 rpm for 15 minutes, whereby an electrode active material layer-forming composition was obtained. The ingredients of the electrode active material layer-forming composition are shown in Table 1. The ingredients of the electrode active material layer-forming compositions that were prepared in the following Examples 2 to 20 and Comparative Examples 1 to 4 are shown in the table as well.

Aluminum foil with a thickness of 15 μm was prepared as a current collector. The electrode active material layer-forming composition was applied to one surface of the current collector with an applicator in such an amount that the weight of the electrode active material layer to be finally formed would be 20 g/m², thereby forming an electrode active material layer-forming coating film.

Next, the current collector having thereon the electrode active material layer-forming coating film was placed in an electric oven (muffle furnace, "P90" manufactured by Denken Co., Ltd., Japan) at normal temperatures and was heated to a temperature of 300° C. over a period of 1 hour, and heating was continued for a further 1 hour while maintaining the temperature. In this manner, there was obtained an anode plate for a non-aqueous electrolyte secondary battery of the present invention, having on the current collector an electrode active material layer suitable as an anode active material layer. The anode plate was taken out of the electric oven and was left as it is until it cooled to room temperature. After this, the anode plate was cut into a piece in a predetermined size (in the shape of a disk with a diameter of 15 mm), whereby an anode plate of Example 1 was obtained. The thickness of the electrode active material layer was measured with a micrometer at 10 points that were selected randomly. The average value of the ten measurements, obtained by calculation, was 30 μm.

Evaluation of Film-Forming Properties

In the production of the anode plate of Example 1, a disk in the desired size was cut out of the anode plate for a non-aqueous electrolyte secondary battery. In this operation, it was possible to obtain the working electrode without suffering any trouble, such as separation of the electrode active material layer. This shows that the electrode active material layer is good in film-forming properties. In the following description of Examples and Comparative Examples, "good in film-forming properties" means that it was possible to cut a disk out of the anode plate (or the cathode plate) without experiencing any trouble. On the other hand, when it was impossible to cut a disk suitable for use as the working electrode of a three-electrode coin cell out of the anode plate (or the cathode plate) since the electrode active material layer partially peeled off or fully fell from the current collector, the electrode active material layer is rated as poor in film-forming properties.

Figure 5:
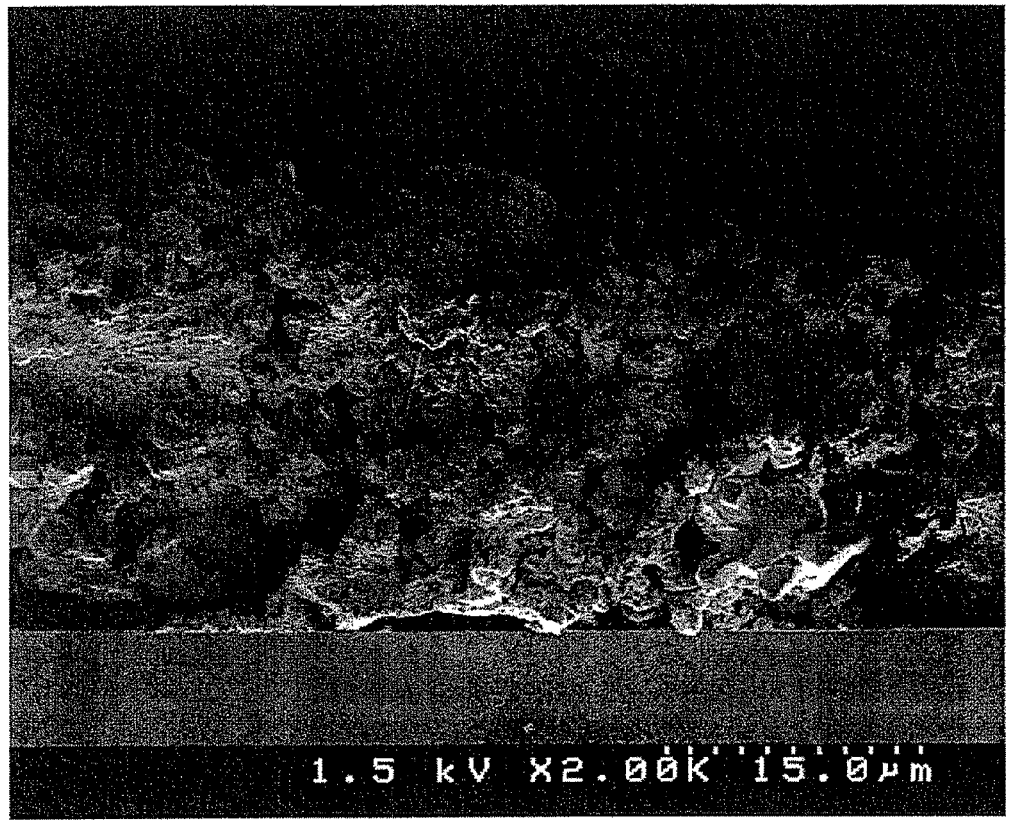
FIG. 5 is an electron micrograph, taken with a scanning electron microscope (SEM) at a magnification of ×2000, of a section of the anode plate of Example 1 taken vertically to its current collector.

The film on the current collector in the anode plate of Example 1 was observed with a scanning electron microscope (SEM) at a magnification of ×2,000. It was confirmed that the particulate anode active material was fixed to the current collector to form a satisfactory film, as shown in FIG. 5.

Composition Analysis:

Scraping off the electrode active material layer from the anode plate of Example 1, Sample 1 was obtained. The composition analysis of Sample 1 was carried out by X-ray electron spectroscopy for chemical analysis. The result was as follows: 12 atomic % element iron, 12 atomic % element manganese, 60 atomic % element oxygen, and 16 atomic % element carbon. Element nitrogen was not detected. The result shows that iron nitrate that had been contained in the electrode active material layer-forming coating film was thermally decomposed into iron oxide.

Figure 6:
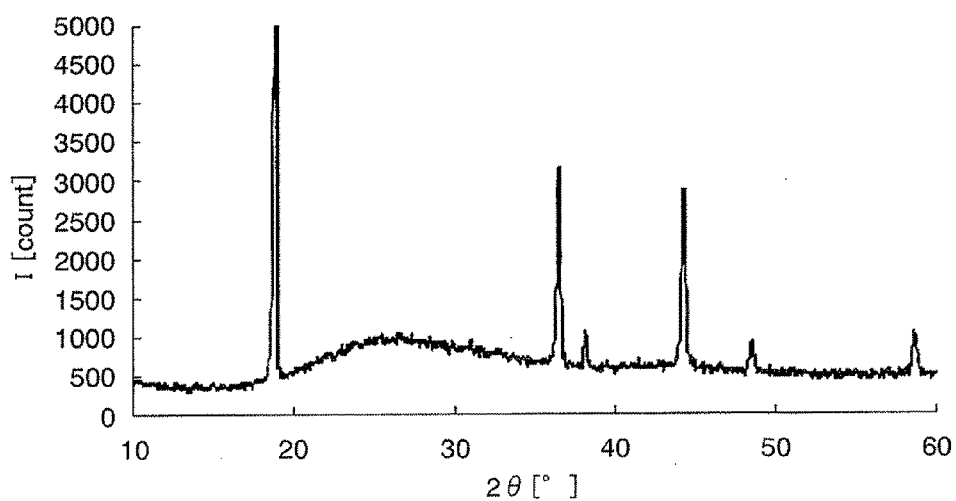
FIG. 6 is a chart showing the X-ray diffraction pattern of the electrode active material in the anode plate of Example 1.
Figure 7:
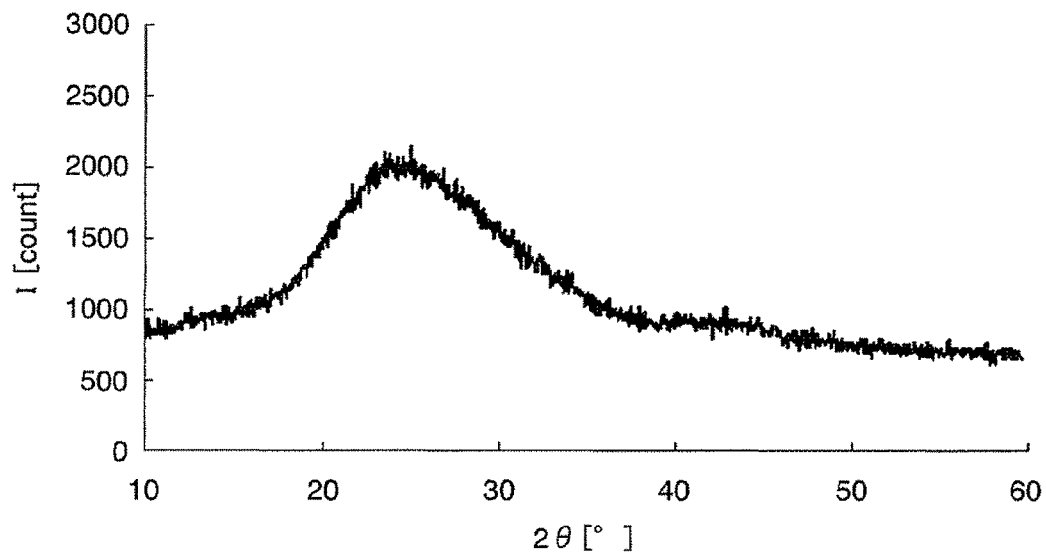
FIG. 7 is a chart showing the X-ray diffraction pattern of iron oxide formed by heating conducted under the same conditions as in the production of the anode plate of Example 1.
Figure 8:
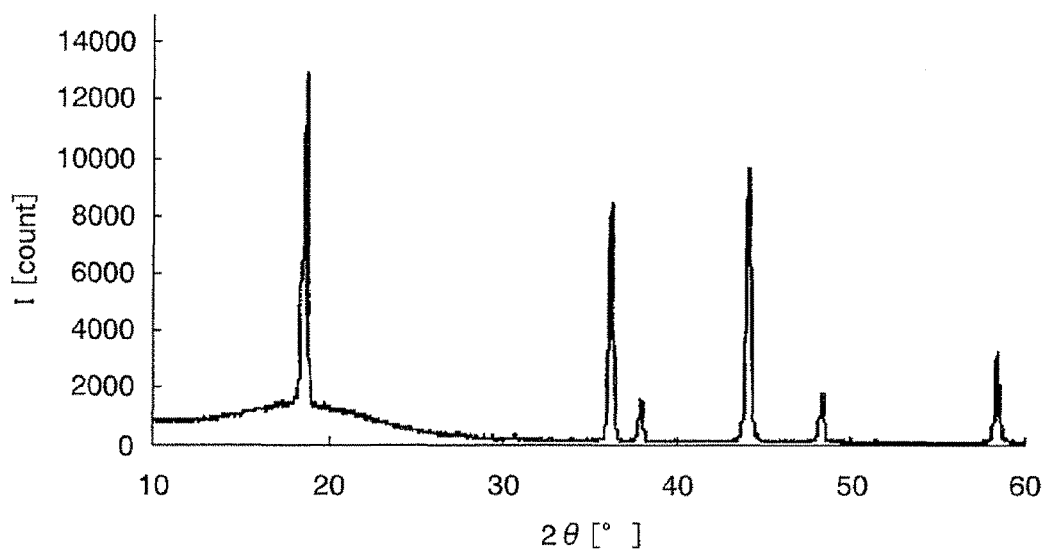
FIG. 8 is a chart showing the X-ray diffraction pattern of lithium manganate, particulate anode active material.

Evaluation of Crystallinity:

The crystallinity of Sample 1 was evaluated by X-ray diffractometry (XRD) using an X-ray diffractometer. As FIG. 6 shows, it was found that the metal oxide present in the electrode active material layer was amorphous. For reference, the result obtained from the evaluation of crystallinity that was made in the following manner is shown in FIG. 7. A starting solution for forming the above metal oxide (a solution to which the anode active material is not added yet) was applied to a glass plate with a Meyer bar No. 4 and was heated under the same conditions as in the production of the electrode plate, thereby forming a film on the glass substrate. A sample was obtained by scraping the film off the glass plate, and its crystallinity was evaluated with the use of an X-ray diffractometer. Separately, the crystallinity of "M1090" used as the particulate anode active material was evaluated by X-ray diffractometry; the result is shown in FIG. 8. FIG. 7 shows the X-ray diffraction pattern of iron oxide that was formed when the starting solution was heated. Peaks were not observed on this diffraction pattern; this shows that the iron oxide is amorphous. FIG. 8 shows the X-ray diffraction pattern of lithium manganate, particulate anode active material. The peaks representing crystalline lithium manganate were observed on this diffraction pattern. The X-ray diffraction pattern shown in FIG. 6 was examined with reference to the diffraction patterns in FIGS. 7 and 8. Only the characteristic peaks representing crystalline lithium manganate were observed on the diffraction pattern in FIG. 6, and it was confirmed that the broad continuum representing amorphous iron oxide overlapped with the peaks representing crystalline lithium manganate.

Figure 3:
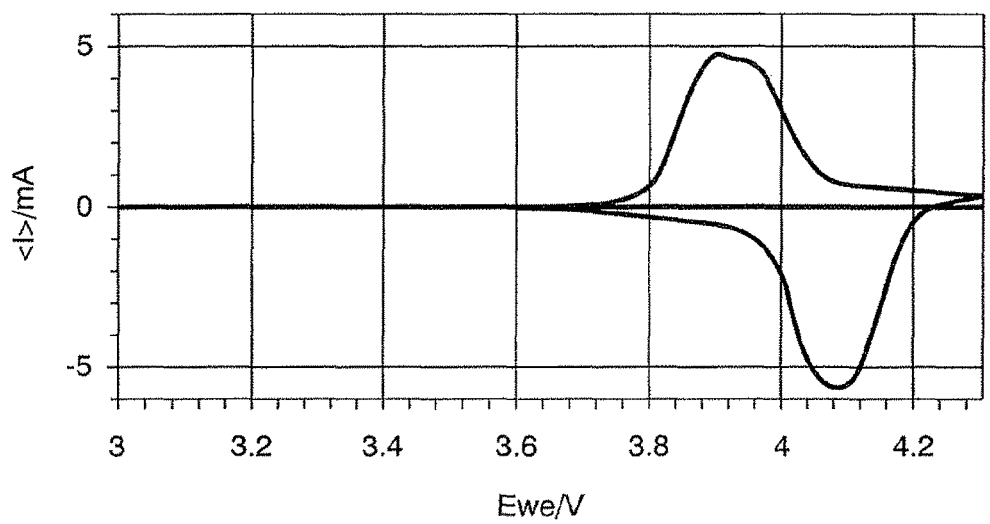
FIG. 3 is a cyclic voltammogram obtained from a cyclic voltammetry test made on a metal oxide that causes lithium ion intercalation and deintercalation reactions.

Cyclic Voltammetry Test (CV Test):

The anode plate of Example 1 was subjected to a CV test. Specifically, the operation of sweeping the electrode potential from 3.0 V to 4.3 V and then returning it to 3.0 V was repeated three times. The scanning rate was made 1 mV/sec. The cyclic voltammogram shown in FIG. 3 corresponds to the result of the second cycle. As is clear from FIG. 3, a peak representing oxidation that is equivalent to lithium deintercalation reaction of $LiMn_2O_4$ was observed at around 3.9 V, and a peak representing reduction that is equivalent to lithium intercalation reaction of $LiMn_2O_4$, at around 4.1 V. On the other hand, a laminate obtained by applying a starting solution for forming the above metal oxide (a solution to which the anode active material is not added yet) to an aluminum substrate with a Meyer bar No 4, and heating the applied solution under the same conditions as in the production of the electrode plate was subjected to the same CV test as is described above. The cyclic voltammogram shown in FIG. 4 corresponds to the result of the second cycle. As is clear from FIG. 4, no electrochemical reaction took place in the film formed on the substrate. It was thus confirmed that the iron oxide serving as a binding material in the anode plate of Example 1 does not cause lithium intercalation and deintercalation reactions. In this example, a VMP3 manufactured by Bio Logic Corp. was used for the CV test. The amount of the electrode active material layer-forming composition applied to the current collector, the thickness and film-forming properties of the electrode active material layer formed on the current collector, the binding material formed in the electrode active material layer, the crystallinity of the binding material, and the results of the CV tests described in this paragraph are collectively shown in Tables 1 and 2. As to the anode plates of the following Examples 2 to 20 and Comparative Examples 1 to 4, the values of these items are shown in the tables as well.

<Assemblage of Three-Electrode Coin Cell>

A non-aqueous electrolyte was prepared by adding lithium phosphate hexafluoride ($LiPF_6$), solute, to a solvent mixture of ethylene carbonate (EC)/dimethyl carbonate (DMC) (=1:1 by volume), and adjusting the lithium phosphate hexafluoride concentration to 1 mol/L.

Using the anode plate of Example 1 (in the shape of a disk with a diameter of 15 mm, weight of the anode active material in the disk: 3.54 mg/1.77 cm$^2$) as the working electrode, metallic lithium plates as the opposite electrode and the reference electrode, and the above-prepared non-aqueous electrolyte as the electrolyte, a three-electrode coin cell was assembled, whereby a test cell of Example 1 (Test Cell 1) was obtained. This test cell was subjected to the following charge and discharge tests.

Charge and Discharge Tests:

Test Cell 1, the three-electrode coin cell assembled in the above-described manner, was fully charged in accordance with the procedure described under the following "Charge Test", before carrying out a discharge test on the working electrode.

(Charge Test)

Test Cell 1 was charged at a constant current (318 μA) in an environment at 25° C., until the voltage reached 4.3 V. After the voltage had reached 4.3 V, the current (discharge rate: 1 C) was reduced to below 5% with the voltage kept below 4.3V, and constant-voltage charging was conducted until the test cell was fully charged. After this, the test cell was rested for 10 minutes. The above "1 C" is the current value at which the three-electrode coin cell discharges completely (the final discharge voltage is attained) in one hour when it is discharged at a constant current. The above constant current was set so that 90 mAh/g, the theoretical discharge capacity of lithium manganate, active material, on the working electrode of Test Cell 1, would be discharged in 1 hour.

(Discharge Test)

Test Cell 1 that had been fully charged was discharged at a constant current (318 μA) (discharge rate: 1 C) in an environment at 25° C. until the voltage decreased from 4.3 V (full charge voltage) to 3.0 V (final discharge voltage). Plotting cell voltage (V) as the ordinate and discharge time (h) as the abscissa, a discharge curve was drawn. Using this curve, the discharge capacity value (mAh) of the working electrode (the anode plate of Example 1) was obtained; it was converted into the value of the discharge capacity per unit weight of the active material layer of the working electrode (mAh/g).

Subsequently, on the basis of the constant-current discharge test carried out in the above-described manner at a constant current of 318 μA (discharge rate: 1 C, discharge completion time: 1 hour), constant-current discharge tests were carried out at a constant current of 15.9 mA, 50 times the above current (discharge rate: 50 C, discharge completion time: 1.2 minutes), and at a constant current of 31.9 mA, 100 times the above current (discharge rate: 100 C, discharge completion time: 0.6 minutes). The discharge capacity values (mAh) of the working electrode at the respective discharge rates were obtained; they were converted into the values of discharge capacity per unit weight (mAh/g).

(Calculation of Percentages of Discharge Capacity Retention)

In order to evaluate the discharge rate characteristics of the working electrode, the percentages of discharge capacity retention were obtained by using the above Equation 1 and the above values of discharge capacity per unit weight (mAh/g) obtained at the respective discharge rates. The percentages of discharge capacity retention of Test Cell 1, obtained by calculation were 91% at 100 C, and 100% at 50 C. The results of the above charge and discharge tests are shown in Table 2.

In the present invention, the discharge rate characteristics of the electrode plate are rated in accordance with the following criteria.

The percentage of discharge capacity retention at a discharge rate of 50 C is 60% or more: ⊚

The percentage of discharge capacity retention at a discharge rate of 50 C is 50% or more and less than 60%: ○

The percentage of discharge capacity retention at a discharge rate of 50 C is 30% or more and less than 50%: Δ

The percentage of discharge capacity retention at a discharge rate of 50 C is less than 30%: x Examples 2 to 20

Example 2

An anode plate of Example 2 was obtained in the same manner as in Example 1, except that 0.48 g of Fe(NO$_3$)$_3$.9H$_2$O [molecular weight: 404], metallic-element-containing compound, was added to 5 g of methanol (this mixture was blended with 10 g of ethylene glycol as in Example 1), and that the electrode active material layer-forming composition was applied to the current collector in the amount shown in Table 1.

Example 3

An anode plate of Example 3 was obtained in the same manner as in Example 1, except that LiMn$_2$O$_4$ with a mean particle diameter of 0.3 μm was used as the anode active material, and that the anode active material was added to 5 g of methanol (this mixture was blended with 10 g of ethylene glycol as in Example 1).

Example 4

An anode plate of Example 4 was obtained in the same manner as in Example 1, except that LiMn$_2$O$_4$ with a mean particle diameter of 10 μm was used as the anode active material, and that the electrode active material was added to 5 g of methanol (this mixture was blended with 10 g of ethylene glycol as in Example 1).

Example 5

An anode plate of Example 5 was obtained in the same manner as in Example 1, except that 4.0 g of Fe(NO$_3$)$_3$.9H$_2$O [molecular weight: 404] and 4.0 g of TiCl$_4$ [molecular weight: 189.68], metallic-element-containing compounds, were added to 17 g of methanol, that the mixture was blended with 10 g of diethylene glycol, and that LiMn$_2$O$_4$ with a mean particle diameter of 1 μm was used as the anode active material.

Example 6

An anode plate of Example 6 was obtained in the same manner as in Example 1, except that 4.0 g of Li(CH$_3$COO).2H$_2$O [molecular weight: 102], metallic-element-containing compound, was added to 16 g of methanol, that the mixture was blended with 10 g of diethylene glycol, that LiMn$_2$O$_4$ with a mean particle diameter of 1 μm was used as the anode active material, that the following heating conditions were used for heating the current collector having thereon the electrode active material layer-forming coating film, and that the electrode active material layer-forming composition was applied to the current collector in the amount shown in Table 1. The heating conditions used in this Example are as follows. The current collector having thereon the electrode active material layer-forming coating film was placed in an electric furnace at normal temperatures and was heated to a temperature of 300° C. over a period of 1 hour. Heating was continued for a further 1 hour while maintaining the temperature. Subsequently, the current collector with the coating film was heated to 420° C. over a period of 15 minutes, and heating was continued for a further 5 minutes while maintaining the temperature.

Example 7

An anode plate of Example 7 was obtained in the same manner as in Example 1, except that 6 g of $Ce(NO_3)_3.6H_2O$ [molecular weight: 434], metallic-element-containing compound, was added to 16 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 8

An anode plate of Example 8 was obtained in the same manner as in Example 1, except that 4.0 g of $Mg(NO_3)_2.6H_2O$ [molecular weight: 256], metallic-element-containing compound, was added to 15 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 9

An anode plate of Example 9 was obtained in the same manner as in Example 1, except that 6.0 g of $Al(NO_3)_3.9H_2O$ [molecular weight: 375], metallic-element-containing compound, was added to 15 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 10

An anode plate of Example 10 was obtained in the same manner as in Example 1, except that 7.0 g of $Ca(NO_3)_2.4H_2O$ [molecular weight: 236], metallic-element-containing compound, was added to 15 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 11

An anode plate of Example 11 was obtained in the same manner as in Example 1, except that 10.0 g of $TiCl_4$ [molecular weight: 189], metallic-element-containing compound, was added to 15 g of methanol, that the mixture was mixed with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 12

An anode plate of Example 12 was obtained in the same manner as in Example 1, except that 9.0 g of $Co(CH_3COO)_2.4H_2O$ [molecular weight: 249], metallic-element-containing compound, was added to 15 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 13

An anode plate of Example 13 was obtained in the same manner as in Example 1, except that 7.0 g of $Ni(CH_3COO)_2.4H_2O$ [molecular weight: 249], metallic-element-containing compound, was added to 13 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 14

An anode plate of Example 14 was obtained in the same manner as in Example 1, except that 7.0 g of $Zn(NO_3)_2.6H_2O$ [molecular weight: 298], metallic-element-containing compound, was added to 20 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 15

An anode plate of Example 15 was obtained in the same manner as in Example 1, except that 9.0 g of yttrium nitrate hexahydrate [molecular weight: 383], metallic-element-containing compound, was added to 15 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 16

An anode plate of Example 16 was obtained in the same manner as in Example 1, except that 7.0 g of $ZrCl_4$ [molecular weight: 233], metallic-element-containing compound, was added to 25 g of methanol, that the mixture was blended with 10 g of diethylene glycol, that $LiMn_2O_4$ with a mean particle diameter of 1 µm was used as the anode active material, and that the electrode active material layer-forming composition was applied to the current collector in the amount shown in Table 1.

Example 17

An anode plate of Example 17 was obtained in the same manner as in Example 1, except that $LiMn_2O_4$ with a mean particle diameter of 0.3 μm was used as the anode active material, and that the electrode active material layer-forming composition was applied to the current collector in the amount shown in Table 1.

Example 18

An anode plate of Example 18 was obtained in the same manner as in Example 1, except that $LiMn_2O_4$ with a mean particle diameter of 1 μm was used as the anode active material, and that the electrode active material layer-forming composition was applied to the current collector in the amount shown in Table 1.

Example 19

An anode plate of Example 19 was obtained in the same manner as in Example 1, except that $LiMn_2O_4$ with a mean particle diameter of 1 μm was used as the anode active material, and that the electrode active material layer-forming composition was applied to the current collector in the amount shown in Table 1.

Example 20

An anode plate of Example 20 was obtained in the same manner as in Example 1, except that $LiMn_2O_4$ with a mean particle diameter of 1 μm was used as the anode active material, and that the electrode active material layer-forming composition was applied to the current collector in the amount shown in Table 1.

Thickness of Electrode Active Material Layer:

The thicknesses of the electrode active material layers in the anode plates of Examples 2 to 20 were measured in the manner described in Example 1. The mean thickness values were obtained by calculation; they are shown in Table 1.

Evaluation of Film-Forming Properties:

The film-forming properties of the electrode active material layers in the anode plates of Examples 2 to 20 were evaluated in the manner described in Example 1. The results are shown in Table 1.

Composition Analysis:

In the same manner as in the preparation of Sample 1, Samples 2 to 20 were obtained from the electrode active material layers formed in Examples 2 to 20, respectively. These samples were subjected to composition analyses. The following are the results of the analyses.

The composition of Sample 2 was as follows: 4 atomic % element iron, 20 atomic % element manganese, 59 atomic % element oxygen, and 17 atomic % element carbon. Element nitrogen was not detected. The result shows that iron nitrate that had been contained in the electrode active material layer-forming coating film was thermally decomposed into iron oxide.

The composition of Sample 3 was as follows: 13 atomic % element iron, 13 atomic % element manganese, 59 atomic % element oxygen, and 15 atomic % element carbon. Element nitrogen was not detected. The result shows that iron nitrate that had been contained in the electrode active material layer-forming coating film was thermally decomposed into iron oxide.

The composition of Sample 4 was as follows: 14 atomic % element iron, 12 atomic % element manganese, 57 atomic % element oxygen, and 17 atomic % element carbon. Element nitrogen was not detected. The result shows that iron nitrate that had been contained in the electrode active material layer-forming coating film was thermally decomposed into iron oxide.

The composition of Sample 5 was as follows: 4 atomic % element iron, 8 atomic % element titanium, 13 atomic % element manganese, 58 atomic % element oxygen, and 17 atomic % element carbon. Neither element nitrogen nor chlorine was detected. The result shows that iron nitrate that had been contained in the electrode active material layer-forming coating film was thermally decomposed into iron oxide.

The composition of Sample 6 was as follows: 18 atomic % element manganese, 63 atomic % element oxygen, and 19 atomic % element carbon. Since lithium is not detectable by the system of this composition analysis, the content of element lithium could not be obtained. It is however known that lithium acetate readily undergoes thermal decomposition, and if lithium acetate were present in Sample 6, the content of element carbon would be higher than the above value. Taking these points into account, it is concluded that the lithium acetate used as the metallic-element-containing compound was decomposed into lithium oxide in the heating step.

The composition of Sample 7 was as follows: 11 atomic % element cerium, 19 atomic % element manganese, 54 atomic % element oxygen, and 16 atomic % element carbon. Element nitrogen was not detected. The result shows that cerium nitrate that had been present in the electrode active material layer-forming coating film was thermally decomposed into cerium oxide.

The composition of Sample 8 was follows: 8 atomic % element magnesium, 20 atomic % element manganese, 55 atomic % element oxygen, and 17 atomic % element carbon. Element nitrogen was not detected. The result shows that magnesium nitrate that had been present in the electrode active material layer-forming coating film was thermally decomposed into magnesium oxide.

The composition of Sample 9 was as follows: 11 atomic % element aluminum, 17 atomic % element manganese, 54 atomic % element oxygen, and 18 atomic % element carbon. Element nitrogen was not detected. The result shows that aluminum nitrate that had been present in the electrode active material layer-forming coating film was thermally decomposed into aluminum oxide.

The composition of Sample 10 was as follows: 6 atomic % element calcium, 20 atomic % element manganese, 57 atomic % element oxygen, and 17 atomic % element carbon. Element nitrogen was not detected. The result shows that calcium nitrate that had been present in the electrode active material layer-forming coating film was thermally decomposed into calcium oxide.

The composition of Sample 11 was as follows: 8 atomic % element titanium, 16 atomic % element manganese, 59 atomic % element oxygen, and 17 atomic % element carbon. Element chlorine was not detected. The result shows that titanium chloride that had been present in the electrode active material layer-forming coating film was thermally decomposed into titanium oxide.

The composition of Sample 12 was as follows: 9 atomic % element cobalt, 15 atomic % element manganese, 60 atomic % element oxygen, and 16 atomic % element carbon. From the content of the detected element carbon, it was understood that the carbon in cobalt acetate was eliminated when heated. It was thus confirmed that cobalt nitrate that had been contained in the electrode active material layer-forming coating film was thermally decomposed into cobalt oxide.

The composition of Sample 13 was as follows: 7 atomic % element nickel, 16 atomic % element manganese, 61 atomic % element oxygen, and 16 atomic % element carbon. From the content of the detected element carbon, it was understood that the carbon in nickel acetate was eliminated when heated. It was thus confirmed that nickel nitrate that had been contained in the electrode active material layer-forming coating film was thermally decomposed into nickel oxide.

The composition of Sample 14 was as follows: 11 atomic % element zirconium, 20 atomic % element manganese, 54 atomic % element oxygen, and 15 atomic % element carbon. Element nitrogen was not detected. The result shows that zinc nitrate that had been present in the electrode active material layer-forming coating film was thermally decomposed into zinc oxide.

The composition of Sample 15 was as follows: 6 atomic % element yttrium, 16 atomic % element manganese, 61 atomic % element oxygen, and 17 atomic % element carbon. Element nitrogen was not detected. The result shows that yttrium nitrate that had been present in the electrode active material layer-forming coating film was thermally decomposed into yttrium oxide.

The composition of Sample 16 was as follows: 5 atomic % element zirconium, 19 atomic % element manganese, 60 atomic % element oxygen, and 16 atomic % element carbon. Element chlorine was not detected. The result shows that zirconium chloride that had been present in the electrode active material layer-forming coating film was thermally decomposed into zirconium oxide.

The composition of Sample 17 was as follows: 13 atomic % element iron, 13 atomic % element manganese, 59 atomic % element oxygen, and 15 atomic % element carbon. Element nitrogen was not detected. The result shows that iron nitrate that had been contained in the electrode active material layer-forming coating film was thermally decomposed into iron oxide.

The composition of Sample 18 was as follows: 12 atomic % element iron, 12 atomic % element manganese, 60 atomic % element oxygen, and 16 atomic % element carbon. Element nitrogen was not detected. The result shows that iron nitrate that had been contained in the electrode active material layer-forming coating film was thermally decomposed into iron oxide.

The composition of Sample 19 was as follows: 12 atomic % element iron, 12 atomic % element manganese, 60 atomic % element oxygen, and 16 atomic % element carbon. Element nitrogen was not detected. The result shows that iron nitrate that had been contained in the electrode active material layer-forming coating film was thermally decomposed into iron oxide.

The composition of Sample 20 was as follows: 12 atomic % element iron, 12 atomic % element manganese, 60 atomic % element oxygen, and 16 atomic % element carbon. Element nitrogen was not detected. The result shows that iron nitrate that had been contained in the electrode active material layer-forming coating film was thermally decomposed into iron oxide.

Evaluation of Crystallinity of Samples 2 to 20:

Evaluation of the crystallinity of Samples 2 to 20 obtained from the electrode active material layers formed in Examples 2 to 20 was made in the same manner as in the evaluation of the crystallinity of Sample 1. The results showed that the metal oxides present in these samples were amorphous like the metal oxide present in Sample 1 (the X-ray diffraction patterns of Samples 2 to 20 are not shown here).

Cyclic Voltammetry Test on Anode Plates of Examples 2 to 20

The anode plates of Examples 2 to 20 were subjected to the same cyclic voltammetry test as was carried out on the anode plate of Example 1, and cyclic voltammograms were obtained. On each cyclic voltammogram, a peak representing oxidation that is equivalent to lithium deintercalation reaction and a peak representing reduction that is equivalent to lithium intercalation reaction were observed (the cyclic voltammograms are not shown here). On the other hand, in Examples 2 to 20, laminates were obtained with the use of starting solutions for forming the above metal oxides (solutions to which the anode active materials are not added yet) in the same manner as in the CV test carried out in Example 1, and were subjected to the CV test. The results showed that no electrochemical reaction took place in the films formed on the substrates. It was thus confirmed that the binding materials in the anode plates of Examples 2 to 20 do not cause lithium intercalation and deintercalation reactions.

Charge and Discharge Tests on Test Cells 2 to 20:

Using the anode plates of Examples 2 to 20, Test Cells 2 to 20 were assembled in the same manner as in the assemblage of Test Cell 1, respectively. The size of the anode plate in the shape of a disk obtained in each Example is the same as in Example 1, and the weight of the anode active material in each disk is shown in Table 2 or 4.

Test Cells 2 to 20 were subjected to the same charge and discharge tests as in Example 1, except that the constant current in Example 1 was changed to the values shown in Tables 2 or 3. In all the charge and discharge tests carried out on the test cells of Examples and of Comparative Examples, the constant current values (discharge rate: 1 C) on discharge were the same as the constant current values (discharge rate: 1 C) on charge, so that the constant current values on charge are not shown in the table. The discharge capacity values (mAh) of each working electrode at the respective discharge rates were obtained. From these values, the discharge rate per weight (mAh/g) was obtained, and the percentage of discharge capacity retention was calculated. The discharge rates per weight (mAh/g) and percentages of discharge capacity retention of Test Cells 2 to 15 are shown in Table 2, and those of Test Cells 16 to 20 are shown in Table 3.

Comparative Example 1

A slurried composition for forming an electrode active material layer, having a solid matter content of 55% by weight, was prepared in the following manner. NMP (manufactured by Mitsubishi Chemical Corp., Japan), organic solvent, was added to 10 g of $LiMn_2O_4$ with a mean particle diameter of 4 μm, anode active material, 1.5 g of acetylene black ("Denka Black" manufactured by Denki Kagaku Kogyo K.K., Japan), 0.1 g of carbon fiber ("VGCF" manufactured by Showa Denko K.K., Japan), and PVDF ("KF#1100" manufactured by KUREHA CORPORATION, Japan), resin binder; and the mixture was kneaded with a homogenizer ("Excel Autohomogenizer" manufactured by NIHON SEIKI KAISHA, Japan) at 7000 rpm for 15 minutes.

And then, there was tried application of the electrode active material layer-forming composition to aluminum foil with a thickness of 15 μm, anode current collector, in such an amount that the dry weight of the composition would be 30 g/m². It was however not easy to control the viscosity of the electrode active material layer-forming composition, and the fluidity of the composition remained low. For this reason, the application of the composition could not be done as desired, failing to form an anode active material layer. It was thus impossible to produce an anode plate for a non-aqueous electrolyte secondary battery.

Comparative Example 2

An anode plate for a non-aqueous electrolyte secondary battery was produced in the same manner as in Example 1, except that no metallic-element-containing compound was used.

When cutting the anode plate into a disk in the predetermined size in the same manner as in Example 1, the electrode active material layer peeled off the current collector, so that it was impossible to obtain a disk-shaped electrode plate that can be used in a three-electrode coin cell. In other words, the electrode active material layer in the anode plate for a non-aqueous electrolyte secondary battery was poor in film-forming properties.

Comparative Example 3

A slurried composition for forming an electrode active material layer was prepared in the same manner as in Comparative Example 1, except that $LiMn_2O_4$ with a mean particle diameter of 10 μm was used as the anode active material. The electrode active material layer-forming composition was applied to aluminum foil with a thickness of 15 μm, anode current collector, in such an amount that the dry weight of the electrode active material layer-forming composition would be 30 $g/m^2$, and was dried with an oven, in an atmosphere of air at a temperature of 120° C. for 20 minutes, thereby forming, on the current collector, an electrode active material layer for the anode. The electrode active material layer formed on the current collector was pressed with a roller press to a coating density of 2.0 $g/cm^3$ (thickness of the anode active material layer: 30 μm). This one was cut into a piece in a predetermined size (in the shape of a disk with a diameter of 15 mm) and was vacuum-dried at 120° C. for 12 hours. In this manner, an anode plate for a non-aqueous electrolyte secondary battery (an anode plate of Comparative Example 3) was obtained. The electrode active material layer in this anode plate was good in film-forming properties, and its thickness was 30 μm.

With the use of the anode plate of Comparative Example 3, a three-electrode coin cell was assembled in the same manner as in Example 1. The three-electrode coin cell was subjected to the same charge and discharge tests as in Example 1, except that the constant current value used in Example 1 was changed. The constant current values used in the charge and discharge tests and the results of the tests are shown in Table 3.

Comparative Example 4

A composition for forming an electrode active material layer was prepared in the same manner as in Comparative Example 1, except that $LiMn_2O_4$ with a mean particle diameter of 1 μm was used as the anode active material. It was however not easy to control the viscosity of the electrode active material layer-forming composition, and the composition remained poor in fluidity. Although application of the electrode active material layer-forming composition to the same aluminum foil as was used in Comparative Example 1 in such an amount that the dry weight of the composition would be 30 $g/m^2$ was tried, it could not be done as desired, failing to form an anode active material layer. It was thus impossible to produce an anode plate for a non-aqueous electrolyte secondary battery.

Example 21

A starting solution for forming a metal oxide that does not cause lithium ion intercalation and deintercalation reactions was prepared by adding 5.0 g of titanium diisopropoxy bis (acetylacetonate) ("TC-100" available from Matsumoto Trading Co., Ltd., Japan), metallic-element-containing compound serving as the binding-material-forming material, to a solution of 1 g of polyethylene oxide, organic material, in 9 g of methanol. Subsequently, to the starting solution was added 7 g of graphite with a mean particle diameter of 4 μm, particulate cathode active material, and the mixture was kneaded with a homogenizer ("Excel Autohomogenizer" manufactured by NIHON SEIKI KAISHA, Japan) at 7000 rpm for 20 minutes, whereby an electrode active material layer-forming composition was prepared.

Copper foil with a thickness of 10 μm was prepared as a current collector. The electrode active material layer-forming composition was applied to one surface of the current collector with an applicator in such an amount that the weight of the electrode active material layer to be finally formed would be 15 $g/m^2$, thereby forming an electrode active material layer-forming coating film.

Next, the current collector having on its surface the electrode active material layer-forming coating film was placed in an electric furnace (high-temperature-atmosphere box furnace, "KB8610N-VP" manufactured by Koyo Thermosystem K.K., Japan) with an atmosphere of an inert gas (nitrogen 99.99%). It was heated to a temperature of 400° C. over a period of 1 hour, and heating was continued for a further 10 minutes while maintaining the temperature (first heating step). The current collector was left as it is until it cooled to room temperature. The furnace was opened to the air, and the current collector with the coating film was taken out of the furnace. After changing the gas in the electric furnace to a hydrogen-containing reducing gas (hydrogen content 4%, nitrogen content 96%), the current collector was heated in the furnace to a temperature of 400° C. over a period of 1 hour, and heating was continued for a further 10 minutes while maintaining the temperature; it was left as it is until it cooled to room temperature (second heating step). The furnace was opened to the air, and the current collector was taken out of it. In this manner, there was obtained a cathode plate for a non-aqueous electrolyte secondary battery of the present invention, having on the current collector an electrode active material layer that contains the metal oxide and the particulate cathode active material, and that is suitable for use as a cathode active material layer. The cathode plate was cut into a piece in a predetermined size (in the shape of a disk with a diameter of 15 mm), whereby a cathode plate of Example 21 was obtained.

Examples 22 to 24

Example 22

A cathode plate of Example 22 was obtained in the same manner as in Example 21, except that the electrode active material layer-forming composition was applied to the current collector in the amount shown in Table 5.

Example 23

A cathode plate of Example 23 was obtained in the same manner as in Example 21, except that graphite with a particle diameter of 10 μm was used as the particulate cathode active material.

Example 24

A cathode plate of Example 24 was obtained in the same manner as in Example 21, except that graphite with a particle diameter of 1 μm was used as the particulate cathode active material, and that the electrode active material layer-forming composition was applied to the current collector in the amount shown in Table 5.

Thickness of Electrode Active Material Layer:

The thicknesses of the electrode active material layers in the cathode plates of Examples 21 to 24 were measured in the same manner as in Example 1. The mean thickness values were obtained by calculation. They are shown in Table 5.

Evaluation of Film-Forming Properties:

The film-forming properties of the electrode active material layers in the cathode plates of Examples 21 to 24 were evaluated in the same manner as in Example 1. The results are shown in Table 5.

Composition Analysis:

In the same manner as in the preparation of Sample 1, Samples 21 to 24 were obtained from the electrode active material layers formed in Examples 21 to 24, respectively. These samples were subjected to composition analyses. The following are the results of the analyses.

The composition of Sample 21 was as follows: 16 atomic % element titanium, 53 atomic % element carbon, and 31 atomic % element oxygen.

The composition of Sample 22 was as follows: 18 atomic % element titanium, 42 atomic % element carbon, and 40 atomic % element oxygen.

The composition of Sample 23 was as follows: 17 atomic % element titanium, 46 atomic % element carbon, and 37 atomic % element oxygen.

The composition of Sample 24 was as follows: 16 atomic % element titanium, 48 atomic % element carbon, and 36 atomic % element oxygen.

The above results show that titanium diisopropoxy bis (acetylacetonate) that had been contained in the electrode active material layer-forming coating films formed in Examples 21 to 24 were thermally decomposed into titanium oxide, and that the titanium oxide was present in the electrode active material layers.

Evaluation of Crystallinity of Samples 21 to 24:

Evaluation of the crystallinity of Samples 21 to 24 was made in the same manner as in the evaluation of the crystallinity of Sample 1. The result showed that the metal oxide (titanium oxide) present in the electrode active material layers, Samples 21 to 24, were amorphous like the metal oxide present in Sample 1 (the X-ray diffraction patterns of Samples 21 to 24 are not shown here).

Cyclic Voltammetry Test on Cathode Plates of Examples 21 to 24

The cathode plates of Examples 21 to 24 were subjected to the CV test, in order to confirm beforehand whether or not the metal oxide (i.e., titanium oxide) making up the electrode active material layers in the cathode plates of Examples 21 to 24 cause lithium ion intercalation and deintercalation reactions. Specifically, the operation of sweeping the electrode potential from 3 V to 0.03V and then returning it to 3 V was repeated three times. The scanning rate was made 1 mV/sec. On the cyclic voltammogram showing the result of the second cycle, peaks representing oxidation and reduction were clearly observed. On the other hand, a laminate obtained by applying a starting solution for forming the above metal oxide (a solution to which the cathode active material is not added yet) to an aluminum substrate with a Meyer bar No. 4, and heating the applied solution under the same conditions as in the production of the electrode plate, was subjected to the same CV test as is described above. On all the cyclic voltammograms showing the results of the first to third cycles, no peaks (electrochemical reactions) were observed. It was thus confirmed that titanium oxide present in the cathode plates of Examples 21 to 24 as a binding material do not cause lithium ion intercalation and deintercalation reactions. The above CV test was carried out with a VMP3 manufactured by Bio Logic Corp.

Charge and Discharge Tests on Test Cells 21 to 24:

A non-aqueous electrolyte was first prepared in the same manner as in the assemblage of Test Cell 1. Using the anode plate of Example 1 and, as the working electrode, the cathode plates of Examples 21, 22, 23 and 24, Test Cells 21 to 24 were assembled in the manner described in the assemblage of Test Cell 1, respectively. These test cells were subjected to the following charge and discharge tests. The following is a description of the charge and discharge tests carried out on Test Cell 21. Test Cells 22 to 24 too were subjected to the same charge and discharge tests, except that the constant current was changed to the current values shown in Table 6.

(Charge Test)

Test Cell 21 was charged at a constant current (707 μA) in an environment at 25° C. until the voltage reached 0.03 V. After the voltage had reached 0.03 V, the current (discharge rate: 1 C) was reduced to below 5% with the voltage retained above 0.03V, and constant-voltage charge was conducted until the test cell was fully charged. After this, the test cell was rested for 10 minutes. The above "1 C" is the current value at which the three-electrode coin cell discharges completely (the final discharge voltage is attained) in one hour when it is discharged at a constant current. The above constant current was set so that 372 mAh/g, the theoretical discharge capacity of graphite that is the active material on the working electrode of Test Cell 21, would be discharged in 1 hour.

(Discharge Test)

Test Cell 21 that had been fully charged was discharged at a constant current (707 μA) (discharge rate: 1 C) in an environment at 25° C. until the voltage increased from 0.03 V (full charge voltage) to 2.0V (final discharge voltage). Plotting cell voltage (V) as the ordinate and discharge time (h) as the abscissa, a discharge curve was drawn. Using this curve, the discharge capacity value (mAh) of the working electrode (the cathode plate of Example 21) was obtained; it was converted into the value of the discharge capacity per unit weight of the working electrode (mAh/g).

Subsequently, on the basis of the constant-current discharge test carried out in the above-described manner at a constant current of 707 μA (discharge rate: 1 C, discharge completion time: 1 hour), constant-current discharge tests were carried out also at discharge rates of 50 C and 100 C. The discharge capacity values (mAh) of the working electrode at the respective discharge rates were obtained; they were converted into the values of discharge capacity per unit weight (mAh/g). The values of discharge capacity per unit weight (mAh/g) and the percentages of discharge capacity retention that were obtained from the above discharge tests on Test Cells 21 to 24 are collectively shown in Table 6.

(Calculation of Percentages of Discharge Capacity Retention)

The percentages of discharge capacity retention of Test Cells 21 to 24 were obtained in the manner described in Example 1. Further, the discharge rate characteristics of the electrodes were rated in accordance with the following criteria.

The percentage of discharge capacity retention at a discharge rate of 50 C is 80% or more and 100% or less: ⊚

The percentage of discharge capacity retention at a discharge rate of 50 C is 50% or more and less than 80%: ○

The percentage of discharge capacity retention at a discharge rate of 50 C is less than 50%: x The results are shown in Table 6.

Evaluation of Adhesion of Electrode Active Material Layer to Current Collector:

Evaluation of the adhesion of the electrode active material layers to the current collectors in the cathode plates of Examples 21 to 24 was made in the following manner. A cellophane tape ("CT24" manufactured by Nichiban Co., Ltd., Japan) was, with the bulb of a finger, stuck to the surfaces of the electrode active material layers in the cathode plates of Examples 21 to 24. After peeling the tape, the surfaces of the electrode active material layers were observed and rated in accordance with the following criteria.

Separation of the electrode active material layer from the current collector was not observed at all: ○

Although the electrode active material layer partially caused cohesive failure and its surface transferred to the cellophane tape, the current collector was not exposed: Δ

The electrode active material layer partially caused cohesive failure and transferred to the cellophane tape; the current collector was partially exposed: x The results are shown in Table 5.

Confirmation of the Presence of Carbonic Matter Distinct from Conductive Materials:

That the carbonic matter distinct from conductive materials had been eliminated from the electrode active material layers in the cathode plates of Examples 21 to 24 was confirmed in the following manner. First, the following preliminary test for Example 21 was carried out. An electrode active material layer-forming composition was prepared in the same manner as in Example 21, except that the particulate cathode active material was not used, and it was applied to the current collector in the above-described manner, thereby forming a coating film. The coating film was heated under the same conditions as in the above-described heating step. In this manner, the absence of carbon atom in the film layered over the current collector was confirmed. Thus, it was confirmed beforehand that carbonic matter that is distinct from conductive materials and that is different also from the particulate active material was not present in the electrode active material layer in Example 21. Further, a section of the cathode plate of Example 21 taken along the thickness of the electrode active material layer was subjected to a nano-order elementary analysis using an EDX detector, and the element carbon map obtained from this analysis was observed by scanning transition electron microscopy (STEM) using a transition electron microscope (TEM). Carbonic matter other than the particulate cathode active material was not observed. In the above-described manner, the absence of carbonic matter in the electrode active material layers in the cathode plates of Examples 22 to 24 was confirmed as well. The results are shown in Table 5.

Evaluation of Coating Properties:

The coating properties of the electrode active material layer-forming compositions applied to the current collectors in Examples 21 to 24 were evaluated after the application step by visually observing the coating films formed on the current collectors and rating them in accordance with the following criteria.

The surface of the coating film was uniform: ⊚

Some irregularities were observed on part of the surface of the coating film: ○

Lines or unevenness in coating were observed on the surface of the coating film: Δ

Such lines or unevenness in coating as to make the cathode plate unfit for use were clearly observed on the surface of the coating film: x The results are shown in Table 5.

Comparative Example 5

Without using any binding-material-forming material, an electrode active material layer-forming composition in the form of a slurry, having a solid matter content of 55% by weight, was prepared in the following manner. NMP (manufactured by Mitsubishi Chemical Corp., Japan), solvent, was added to 10 g of graphite with a mean particle diameter of 12 μm, cathode active material, and 1.3 g of PVDF ("KF#1100" manufactured by KUREHA CORPORATION, Japan), resin binder, and the mixture was kneaded with a homogenizer ("Excel Autohomogenizer" manufactured by NIHON SEIKI KAISHA, Japan) at 7000 rpm for 15 minutes.

The electrode active material layer-forming composition was applied to copper foil with a thickness of 10 μm, cathode current collector, in such an amount that the dry weight of the electrode active material layer-forming composition would be 65 g/m$^2$, and was then dried with an oven, in an atmosphere of air at 70° C., thereby forming on the current collector an electrode active material layer for a cathode plate.

Subsequently, the electrode active material layer formed on the current collector was pressed with a roller press until its thickness reached about 85 μm. The current collector with the pressed electrode active material layer was cut into a piece in a predetermined size (in the shape of a disk with a diameter of 15 mm), and was vacuum-dried at 70° C. for 300 minutes. In this manner, a cathode plate of Comparative Example 5 was obtained.

Comparative Examples 6 to 9

Cathode plates of Comparative Examples 6 to 9 were obtained in the same manner as in the production of the cathode plate of Comparative Example 5, except that the graphite with a mean particle diameter of 12 μm, particulate cathode active material, was changed to graphite with the particle diameters shown in Table 4, that the amount of the electrode active material layer-forming composition applied to the current collector was changed to the ones shown in Table 5, and that the thickness of the electrode active material layer was changed to the ones shown in Table 5.

In order to carry out charge and discharge tests on the cathode plates of Comparative Examples 5 to 9 in the same manner as in Example 21, assemblage of Comparative Test Cells 5 to 9 was tried in the same manner as in the assemblage of Test Cell 21. Since the electrode active material layers in the cathode plates of Comparative Examples 6 to 9 were poor in the film-forming properties, Comparative Test Cells 6 to 9 (three-electrode coin cells) could not be assembled with the use of these cathode plates, and thus it was impossible to carry out the charge and discharge tests. Comparative Test Cell 5 assembled successfully was subjected to the same charge and discharge tests as in Example 21, except that the constant current in Example 21 was changed to the one shown in Table 6. All the results obtained from the above are shown in Table 6.

The cathode plates of Comparative Examples 5 to 9 were subjected to the same tests for evaluating film-forming properties, coating properties and adhesion properties as were carried out on the cathode plate of Example 21. The results are collectively shown in Table 5.

The above results of the charge and discharge tests on the anode plates of Examples 1 to 20 and of Comparative Examples 1 to 4 show the following. The percentages of discharge capacity retention of the anode plates of Examples 1 to 20 and that of Comparative Example 3 at a discharge rate of 1 C are about 100%. As the discharge rate increases, the percentage of discharge capacity retention of the anode plate of Comparative Example 3 decreases significantly, although those of all the anode plates of Examples 1 to 20 remain high.

In Comparative Example 2, the production of an anode plate was tried in the same manner as in the production of the anode plate of Example 1, except that no metal oxide was formed in the electrode active material layer. The electrode active material layer, however, was poor in film-forming properties and peeled off the current collector, so that it was impossible to produce an anode plate. This shows that the metal oxide present in the electrode active material layer in the anode plate of Example 1 surely acts as a binding material.

Further, in Comparative Examples 1 to 4, the production of anode plates using conventional resin binders was tried. However, since the particle diameters of the particulate anode active materials used in the electrode active material layer-forming compositions were as small as 5 µm or less, it was difficult to control the viscosity of the electrode active material layer-forming compositions. It was thus impossible to produce anode plates. On the other hand, the results of the evaluation of the anode plates of Examples showed the following: even when a particulate anode active material with a small particle diameter of 5 µm or less is used, it is possible to produce an anode plate successfully, and the percentage of discharge capacity retention of the anode plate is extremely high.

Furthermore, the above results of the tests on the cathode plates of Examples 21 to 24 and of Comparative Examples 5 to 9 show that all the cathode plates of Examples 21 to 24 are extremely good in output and input characteristics. Although metal oxides were made to exist as binding materials in place of resin binders in the production of the cathode plates of Examples 21 to 24, it was confirmed that the cathode plates of Examples 21 to 24 were superior to conventional cathode plates in the above-described film-forming properties and adhesion to current collectors. In the production of the cathode plates of Examples 21 to 24, the electrode active material layer-forming compositions showed good coating properties irrespective of the particle diameters of the particulate active materials used in the compositions. On the other hand, in the production of the cathode plates of Comparative Examples 5 and 6 in which a particulate cathode active material with a particle diameter of 12 µm was used, the electrode active material layer-forming compositions showed moderate coating properties, but in the production of the cathode plates of Comparative Examples 7 to 9 in which particulate cathode active materials with particle diameters of 10 µm or less were used, the electrode active material layer-forming compositions were poor in coating properties. It is thus confirmed that in the present invention, even a particulate cathode active material with a small particle diameter, of which use has been difficult in the prior art, can be used without difficulty.

As mentioned above, the cathode plates of Examples 21 to 24, cathode plates of the present invention, show extremely excellent output and input characteristics as compared with the cathode plates of Comparative Examples 5 to 9. It is thus understood that when a cathode plate of the present invention is used for a non-aqueous electrolyte secondary battery, the battery shows desirably improved output and input characteristics.

The electrode plates for non-aqueous electrolyte secondary batteries of the present invention showed extremely high percentages of discharge capacity retention either when used as the anode plate or when used as the cathode plate, as described above. It was thus confirmed that the electrode plates of the present invention have extremely high discharge rate characteristics. From this was deduced that the electrode plates are excellent in charge rate characteristics as well. That is, it was confirmed by the results of the above charge and discharge tests that the electrode plates of the present invention are excellent in output and input characteristics. Further, the adhesion tests were made on the cathode plates of Examples as the evaluation of electrode plates of the present invention. The test results showed that the cathode plates were excellent in adhesion properties. This feature is not limited to cathode plates of the invention, and anode plates of the invention have the same excellent adhesion properties. The use of an electrode plate of invention as the anode plate and/or the cathode plate, therefore, makes it possible to provide a non-aqueous electrolyte secondary battery more excellent in discharge rate characteristics than ever.

The above Examples were performed according to the production method of the present invention. The above-described method of the invention, for producing an electrode plate for a non-aqueous electrolyte secondary battery, does not require the pressing step, unlike a conventional production method, and is composed of very simple steps. Moreover, since no resin binder is used unlike in the prior art, and instead, a precursor to a binding material is incorporated in an electrode active material layer-forming composition, it is possible to obtain an electrode active material layer-forming composition with a desirable viscosity value irrespective of the particle diameter of the particulate electrode active material used in the composition. It was thus confirmed that it is very easy to apply the electrode active material layer-forming composition to a current collector. Furthermore, it was shown that when the production method of the present invention is employed, it is possible to produce not only an electrode plate having an electrode active material layer with a conventional thickness but also an electrode plate having an electrode active material layer with an extremely small thickness. It was also shown that electrode plates obtained by the production method of the invention have extremely desirable discharge rate characteristics, as mentioned above.

TABLE 1

| | | Particle diameter of anode active material (LiMn$_2$O$_4$) | Metal-containing compound | Amount of metal-containing compound | Solvent type | Amount | Coating weight of electrode active material layer-forming solution (g/m$^2$) (*1) | Thickness of electrode active material layer | Film-forming properties | Binding material (binder) |
|---|---|---|---|---|---|---|---|---|---|---|
| Example | 1 | 4 μm | F$_e$(NO$_3$)$_3$·9H$_2$O | 9 g | Methanol/ethylene glycol | 17 g/10 g | 20 | 30 μm | good | Iron oxide |
| | 2 | 4 μm | F$_e$(NO$_3$)$_3$·9H$_2$O | 0.48 g | Methanol/ethylene glycol | 5 g/10 g | 6 | 10 μm | good | Iron oxide |
| | 3 | 0.3 μm | F$_e$(NO$_3$)$_3$·9H$_2$O | 9 g | Methanol/ethylene glycol | 5 g/10 g | 20 | 30 μm | good | Iron oxide |
| | 4 | 10 μm | F$_e$(NO$_3$)$_3$·9H$_2$O | 9 g | Methanol/ethylene glycol | 5 g/10 g | 20 | 30 μm | good | Iron oxide |
| | 5 | 1 μm | F$_e$(NO$_3$)$_3$·9H$_2$O/TiCl$_4$ | 4 g/4 g | Methanol/diethylene glycol | 17 g/10 g | 20 | 31 μm | good | iron-titanium double oxide |
| | 6 | 1 μm | Li(CH$_3$COO)·2 H$_2$O | 4 g | Methanol/diethylene glycol | 16 g/10 g | 5 | 10 μm | good | Lithium oxide |
| | 7 | 1 μm | Ce(NO$_3$)$_3$·6H$_2$O | 6 g | Methanol/diethylene glycol | 16 g/10 g | 3 | 8 μm | good | Cerium oxide |
| | 8 | 1 μm | Mg(NO$_3$)$_2$·6H$_2$O | 4 g | Methanol/diethylene glycol | 15 g/10 g | 2 | 11 μm | good | Magnesium oxide |
| | 9 | 1 μm | Al(NO$_3$)$_3$·9H$_2$O | 6 g | Methanol/diethylene glycol | 15 g/10 g | 2 | 8 μm | good | Aluminum oxide |
| | 10 | 1 μm | Ca(NO$_3$)$_2$·4H$_2$O | 7 g | Methanol/diethylene glycol | 15 g/10 g | 3 | 12 μm | good | Calcium oxide |
| | 11 | 1 μm | TiCl$_4$ | 10 g | Methanol/diethylene glycol | 15 g/10 g | 3 | 9 μm | good | Titanium oxide |
| | 12 | 1 μm | Co(CH$_3$COO)$_2$·4H$_2$O | 9 g | Methanol/diethylene glycol | 15 g/10 g | 5 | 14 μm | good | Cobalt oxide |
| | 13 | 1 μm | Ni(CH$_3$COO)$_2$·4H$_2$O | 7 g | Methanol/diethylene glycol | 13 g/10 g | 5 | 16 μm | good | Nickel oxide |
| | 14 | 1 μm | Zn(NO$_3$)$_2$·6H$_2$O | 7 g | Methanol/diethylene glycol | 20 g/10 g | 3 | 10 μm | good | Zinc oxide |
| | 15 | 1 μm | Y(NO$_3$)$_3$·6H$_2$O | 9 g | Methanol/diethylene glycol | 15 g/10 g | 3 | 10 μm | good | Yitrium oxide |
| | 16 | 1 μm | ZrCl$_4$ | 7 g | Methanol/diethylene glycol | 25 g/10 g | 3 | 12 μm | good | Zirconium oxide |
| | 17 | 0.3 μm | F$_e$(NO$_3$)$_3$·9H$_2$O | 9 g | Methanol/ethylene glycol | 17 g/10 g | 1 | 500 nm | good | Iron oxide |
| | 18 | 1 μm | F$_e$(NO$_3$)$_3$·9H$_2$O | 9 g | Methanol/ethylene glycol | 17 g/10 g | 13 | 20 μm | good | Iron oxide |
| | 19 | 1 μm | F$_e$(NO$_3$)$_3$·9H$_2$O | 9 g | Methanol/ethylene glycol | 17 g/10 g | 6 | 12 μm | good | Iron oxide |
| | 20 | 1 μm | F$_e$(NO$_3$)$_3$·9H$_2$O | 9 g | Methanol/ethylene glycol | 17 g/10 g | 3 | 6 μm | good | Iron oxide |
| Comparative Example | 1 | 4 μm | (*2) | — | NMP | — | 30 | n.t | poor | Resin binder |
| | 2 | 4 μm | — | — | Methanol/ethylene glycol | 17 g/10 g | 20 | n.t | poor | — |
| | 3 | 10 μm | (*2) | — | NMP | — | 30 | 30 μm | good | Resin binder |
| | 4 | 1 μm | (*2) | — | NMP | — | 30 | n.t | n.t | Resin binder |

(*1) The weight per unit area of the finally obtained electrode active material layer.
(*2) PVDF (1.3 g) was used as the binding material.
**In all Examples and Comparative Examples, acetylene black (1.5 g) and carbon fiber (0.1 g) were used as in Example 1.
***The anode active material was used in an amount of 10 g.

TABLE 2

| | | Weight per unit area of anode active material (mg/1.77 cm$^2$) | Discharge rate | Constant current | Discharge capacity (mAhr/g) | Percentage of discharge capacity retention | Output characteristics rating | Crystallinity of binding material | CV test (*2) |
|---|---|---|---|---|---|---|---|---|---|
| Example | 1 | 3.54 | 1 c | 318 μA | 91 | — | ◎ | amorphous | none |
| | | | 50 c | 15.9 mA | 91 | 100% | | | |
| | | | 100 c | 31.9 mA | 83 | 91% | | | |
| | 2 | 3.23 | 1 c | 101 μA | 91 | — | ◎ | amorphous | none |
| | | | 50 c | 5.04 mA | 91 | 100% | | | |
| | | | 100 c | 10.08 mA | 90 | 99% | | | |

TABLE 2-continued

|  | Weight per unit area of anode active material (mg/1.77 cm$^2$) | Discharge rate | Constant current | Discharge capacity (mAhr/g) | Percentage of discharge capacity retention | Output characteristics rating | Crystallinity of binding material | CV test (*2) |
|---|---|---|---|---|---|---|---|---|
| 3 | 3.48 | 1 c | 313 μA | 91 | — | ◎ | amorphous | none |
|  |  | 50 c | 15.66 mA | 91 | 100% |  |  |  |
|  |  | 100 c | 31.32 mA | 91 | 100% |  |  |  |
| 4 | 3.61 | 1 c | 325 μA | 91 | — | ◎ | amorphous | none |
|  |  | 50 c | 16.25 mA | 91 | 100% |  |  |  |
|  |  | 100 c | 32.49 mA | 71 | 78% |  |  |  |
| 5 | 3.38 | 1 c | 304 μA | 91 | — | ◎ | amorphous | none |
|  |  | 50 c | 15.21 mA | 91 | 100% |  |  |  |
|  |  | 100 c | 30.42 mA | 83 | 91% |  |  |  |
| 6 | 0.8 | 1 c | 72 μA | 91 | — | ○ | amorphous | none |
|  |  | 50 c | 3.6 mA | 46 | 51% |  |  |  |
|  |  | 100 c | 7.2 mA | 29 | 32% |  |  |  |
| 7 | 0.5 | 1 c | 45 μA | 91 | — | ○ | amorphous | none |
|  |  | 50 c | 2.3 mA | 46 | 50% |  |  |  |
|  |  | 100 c | 4.5 mA | 24 | 26% |  |  |  |
| 8 | 0.3 | 1 c | 27 μA | 91 | — | ◎ | amorphous | none |
|  |  | 50 c | 1.35 mA | 65 | 71% |  |  |  |
|  |  | 100 c | 2.7 mA | 27 | 30% |  |  |  |
| 9 | 0.3 | 1 c | 32 μA | 91 | — | ◎ | amorphous | none |
|  |  | 50 c | 1.58 mA | 62 | 68% |  |  |  |
|  |  | 100 c | 3.15 mA | 28 | 31% |  |  |  |
| 10 | 0.5 | 1 c | 48 μA | 91 | — | ◎ | amorphous | none |
|  |  | 50 c | 2.39 mA | 84 | 92% |  |  |  |
|  |  | 100 c | 4.77 mA | 65 | 71% |  |  |  |
| 11 | 0.6 | 1 c | 52 μA | 91 | — | ◎ | amorphous | none |
|  |  | 50 c | 2.61 mA | 91 | 100% |  |  |  |
|  |  | 100 c | 5.22 mA | 89 | 98% |  |  |  |
| 12 | 0.7 | 1 c | 65 μA | 91 | — | ◎ | amorphous | none |
|  |  | 50 c | 3.24 mA | 56 | 62% |  |  |  |
|  |  | 100 c | 6.48 mA | 30 | 33% |  |  |  |
| 13 | 0.8 | 1 c | 107 μA | 91 | — | ◎ | amorphous | none |
|  |  | 50 c | 5.33 mA | 64 | 70% |  |  |  |
|  |  | 100 c | 10.66 mA | 30 | 33% |  |  |  |
| 14 | 0.5 | 1 c | 69 μA | 91 | — | ◎ | amorphous | none |
|  |  | 50 c | 3.45 mA | 60 | 66% |  |  |  |
|  |  | 100 c | 6.89 mA | 25 | 28% |  |  |  |
| 15 | 0.4 | 1 c | 57 μA | 91 | — | ◎ | amorphous | none |
|  |  | 50 c | 2.86 mA | 91 | 100% |  |  |  |
|  |  | 100 c | 5.72 mA | 81 | 89% |  |  |  |

*1 The weight of the anode active material (mg/1.77 cm$^2$) in the disk with a diameter of 15 mm cut out of the anode plate of Example.
(*2) When the binding material does not cause lithium intercalation and deintercalation reactions, it is rated as "none".

TABLE 3

|  |  | Weight per unit area of anode active material (mg/1.77 cm$^2$) | Discharge rate | Constant current | Discharge capacity (mAhr/g) | Percentage of discharge capacity retention | Output characteristics rating | Crystallinity of binding material | CV test (*2) |
|---|---|---|---|---|---|---|---|---|---|
| Example | 16 | 0.3 | 1 c | 39 μA | 91 | — | ◎ | amorphous | none |
|  |  |  | 50 c | 1.95 mA | 67 | 74% |  |  |  |
|  |  |  | 100 c | 3.9 mA | 25 | 27% |  |  |  |
|  | 17 | 0.1 | 1 c | 14 μA | 91 | — | ◎ | amorphous | none |
|  |  |  | 50 c | 715 mA | 91 | 100% |  |  |  |
|  |  |  | 100 c | 1.43 mA | 91 | 100% |  |  |  |
|  | 18 | 2.3 | 1 c | 207 μA | 91 | — | ◎ | amorphous | none |
|  |  |  | 50 c | 10.35 mA | 91 | 100% |  |  |  |
|  |  |  | 100 c | 20.07 mA | 86 | 95% |  |  |  |
|  | 19 | 1.1 | 1 c | 99 μA | 91 | — | ◎ | amorphous | none |
|  |  |  | 50 c | 4.95 mA | 91 | 100% |  |  |  |
|  |  |  | 100 c | 9.90 mA | 89 | 98% |  |  |  |
|  | 20 | 0.5 | 1 c | 43 μA | 91 | — | ◎ | amorphous | none |
|  |  |  | 50 c | 2.16 mA | 91 | 100% |  |  |  |
|  |  |  | 100 c | 4.32 mA | 91 | 100% |  |  |  |
| Comparative Example | 1 | — | 1 c | n.t | n.t | n.t | X | n.t | n.t |
|  |  |  | 50 c | n.t | n.t | n.t |  |  |  |
|  |  |  | 100 c | n.t | n.t | n.t |  |  |  |
|  | 2 | — | 1 c | n.t | n.t | n.t | X | n.t | n.t |
|  |  |  | 50 c | n.t | n.t | n.t |  |  |  |
|  |  |  | 100 c | n.t | n.t | n.t |  |  |  |

TABLE 3-continued

| | Weight per unit area of anode active material (mg/1.77 cm$^2$) | Discharge rate | Constant current | Discharge capacity (mAhr/g) | Percentage of discharge capacity retention | Output characteristics rating | Crystallinity of binding material | CV test (*2) |
|---|---|---|---|---|---|---|---|---|
| 3 | 5.5 | 1 c | 351 μA | 91 | — | Δ | — | — |
|   |     | 50 c | 17.55 mA | 28 | 31% | | | |
|   |     | 100 c | 35.10 mA | 13 | 14% | | | |
| 4 | — | 1 c | n.t | n.t | n.t | X | n.t | n.t |
|   |   | 50 c | n.t | n.t | n.t | | | |
|   |   | 100 c | n.t | n.t | n.t | | | |

*1 The weight of the anode active material (mg/1.77 cm$^2$) in the disk with a diameter of 15 mm cut out of the anode plate of Example or Comparative Example.
(*2) When the binding material does not cause lithium intercalation and deintercalation reactions, it is rated as "none".

TABLE 4

| | | Particle diameter of cathode active material (graphite) | Binding-material-forming material Type | amount | solvent Type | amount | Organic material added Type | amount |
|---|---|---|---|---|---|---|---|---|
| Example | 21 | 4 μm | Titanium diisopropoxybis (acetylacetonate) | 5 g | methanol | 9 g | Polyethylane oxide | 1 g |
|  | 22 | 4 μm | Titanium diisopropoxybis (acetylacetonate) | 5 g | methanol | 9 g | Polyethylane oxide | 1 g |
|  | 23 | 10 μm | Titanium diisopropoxybis (acetylacetonate) | 5 g | methanol | 9 g | Polyethylane oxide | 1 g |
|  | 24 | 1 μm | Titanium diisopropoxybis (acetylacetonate) | 5 g | methanol | 9 g | Polyethylane oxide | 1 g |
| Comparative Example | 5 | 12 μm | — (PVDF resin) | (1.3 g) | NMP | — | — | — |
|  | 6 | 12 μm | — (PVDF resin) | (1.3 g) | NMP | — | — | — |
|  | 7 | 10 μm | — (PVDF resin) | (1.3 g) | NMP | — | — | — |
|  | 8 | 4 μm | — (PVDF resin) | (1.3 g) | NMP | — | — | — |
|  | 9 | 1 μm | — (PVDF resin) | (1.3 g) | NMP | — | — | — |

TABLE 5

| | Coating weight of electrode active material layer-forming solution (g/m$^2$) (*1) | Thickness of electrode active material layer | Film-forming properties | Binding material (binder) | Crystallinity of binding material | Carbonic matter distinct from conductive material in electrode active material layer | CV test (lithium ion intercalation and deintercalation) | Coating properties | Adhesion properties |
|---|---|---|---|---|---|---|---|---|---|
| Example 21 | 15 | 25 μm | good | Titanium oxide | amorphous | none | none | ⊚ | ○ |
| Example 22 | 21 | 61 μm | good | Titanium oxide | amorphous | none | none | ⊚ | ○ |
| Example 23 | 15 | 28 μm | good | Titanium oxide | amorphous | none | none | ⊚ | ○ |
| Example 24 | 2 | 5 μm | good | Titanium oxide | amorphous | none | none | ⊚ | ○ |
| Comparative Example 5 | 65 | 85 μm | good | Resin binder | n.t. | n.t. | n.t. | ○ | Δ |
| Comparative Example 6 | 15 | 30 μm | poor | Resin binder | n.t. | n.t. | n.t. | ○ | Δ |
| Comparative Example 7 | 15 | 29 μm | poor | Resin binder | n.t. | n.t. | n.t. | Δ | Δ |
| Comparative Example 8 | 15 | 30 μm | poor | Resin binder | n.t. | n.t. | n.t. | X | Δ |
| Comparative Example 9 | 2 | 5 μm | poor | Resin binder | n.t. | n.t. | n.t. | X | Δ |

(*1) The weight per unit area of the finally obtained electrode active material layer.
(*2) When the binding material does not cause lithium intercalation and deintercalation reactions, it is rated as "none".

TABLE 6

| Example | Weight per unit area of cathode active material (mg/1.77 cm$^2$) *2 | Discharge rate | Constant current | Discharge capacity (mAhr/g) | Percentage of discharge capacity retention | Output characteristics rating |
|---|---|---|---|---|---|---|
| Example 21 | 1.9 | 1 C | 707 μm | 363 | — | ◎ |
|  |  | 50 C | 35.3 mA | 327 | 90% |  |
|  |  | 100 C | 70.7 mA | 277 | 76% |  |
| Example 22 | 6.7 | 1 C | 2.48 mA | 366 | — | ○ |
|  |  | 50 C | 124 mA | 282 | 77% |  |
|  |  | 100 C | 248 mA | 11 | 0% |  |
| Example 23 | 1.9 | 1 C | 692 μA | 351 | — | ◎ |
|  |  | 50 C | 34.6 mA | 340 | 97% |  |
|  |  | 100 C | 69.2 mA | 324 | 92% |  |
| Example 24 | 0.5 | 1 C | 178 μA | 367 | — | ◎ |
|  |  | 50 C | 8.9 mA | 367 | 100% |  |
|  |  | 100 C | 17.8 mA | 367 | 100% |  |
| Comparative Example 5 | 10 | 1 C | 3.7 mA | 364 | — | X |
|  |  | 50 C | 185 mA | 4 | 0% |  |
|  |  | 100 C | 370 mA | 0 | 0% |  |
| Comparative Example 6 | Owing to poor film-forming properties, lines occurred, whose cause was probably agglomerates. | | | | | |
| Comparative Example 7 | Owing to poor film-forming properties, lines occurred, whose cause was probably agglomerates. | | | | | |
| Comparative Example 8 | Owing to poor film-forming properties, lines occurred, whose cause was probably agglomerates. | | | | | |
| Comparative Example 9 | Owing to poor film-forming properties, lines occurred, whose cause was probably agglomerates. | | | | | |

*2 The weight of the particulate active material (mg/1.77 cm$^2$) in the disk with a diameter of 15 mm cut out of the cathode plate of Example or Comparative Example.

The invention claimed is:

1. A method for producing an electrode plate for a non-aqueous electrolyte secondary battery, comprising the steps of:
applying an electrode active material layer-forming composition containing at least a solvent, a particulate electrode active material, and a metallic-element-containing compound for forming a metal oxide that serves as a binding material to at least part of a current collector, thereby forming a coating film, and
heating the coating film so as to evaporate the solvent and to decompose the metallic-element-containing compound thermally into a metal oxide, thereby forming, on the current collector, an electrode active material layer containing the metal oxide and the particulate electrode active material,
wherein a metallic-element-containing compound that forms, in the heating step, a metal oxide that does not cause alkaline metal ion intercalation and deintercalation reactions is selected beforehand as the metallic-element-containing compound,
wherein in the heating step, the coating film is heated at a temperature that is equal to or more than the temperature at which the metallic-element-containing compound begins to decompose thermally, and that is less than the crystallization temperature of the metal oxide that is formed in the heating step; and
wherein the electrode active material layer-forming composition does not contain a resinous binder.

2. The method for producing an electrode plate for a non-aqueous electrolyte secondary battery according to claim 1, wherein the metallic-element-containing compound is a metal salt.

* * * * *